US006857000B2

(12) United States Patent
Hattori et al.

(10) Patent No.: US 6,857,000 B2
(45) Date of Patent: Feb. 15, 2005

(54) OBJECT-ORIENTED DATA STORAGE AND RETRIEVAL SYSTEM USING INDEX TABLE

(75) Inventors: Masakazu Hattori, Minato-ku (JP); Mikito Iwamasa, Minato-ku (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 217 days.

(21) Appl. No.: 10/294,610

(22) Filed: Nov. 15, 2002

(65) Prior Publication Data

US 2003/0088576 A1 May 8, 2003

Related U.S. Application Data

(62) Division of application No. 09/176,317, filed on Oct. 22, 1998, now Pat. No. 6,539,388.

(30) Foreign Application Priority Data

Oct. 22, 1997 (JP) .............................................. 9-289770
Nov. 10, 1997 (JP) .............................................. 9-307460

(51) Int. Cl.[7] ............................................. G06F 17/30
(52) U.S. Cl. ............................. 707/103 R; 707/104.1
(58) Field of Search ......................... 707/1, 2, 10, 100, 707/101, 103 R, 104.1; 717/103, 165; 709/217, 219

(56) References Cited

U.S. PATENT DOCUMENTS

| 5,448,726 | A | * | 9/1995 | Cramsie et al. ......... 707/103 R |
| 5,649,190 | A | * | 7/1997 | Sharif-Askary et al. .... 707/101 |
| 5,666,524 | A | | 9/1997 | Kunkel et al. ................. 707/3 |
| 5,680,614 | A | * | 10/1997 | Bakuya et al. .......... 707/103 R |
| 5,724,575 | A | * | 3/1998 | Hoover et al. ................. 707/10 |
| 5,857,197 | A | | 1/1999 | Mullins ................... 707/103 R |
| 5,983,216 | A | | 11/1999 | Kirsch et al. .................... 707/2 |
| 6,006,214 | A | | 12/1999 | Carey et al. .................... 707/2 |
| 6,122,627 | A | | 9/2000 | Carey et al. .................... 707/4 |
| 6,134,540 | A | | 10/2000 | Carey et al. .................... 707/2 |
| 6,539,388 | B1 | * | 3/2003 | Hattori et al. .............. 707/101 |

FOREIGN PATENT DOCUMENTS

JP            63-273947         11/1988

OTHER PUBLICATIONS

Taguchi, Tanaka, Caloini, A. Yano "Multimedia Authoring System MediaDesc(3)—Scene Editor –", Information Processing Society of Japan, 52$^{nd}$ (1996, 1$^{st}$ term) National Meeting, Articles (3), pp. 239–240 (Hei8–3–6).

Robert Orfali, et al., The Essential Distributed Objects Survival Guide, Chapter 16, pps. 283–295, Chapter 20, pps. 343–355, 1996.

Serge Abiteboul, et al., Sigmod Record, vol. 20, No. 2, pps. 1–24 and Appendix pps. l–iv, "Objects and Views", Dec. 30, 1993.

IBM TDB ("Access Path Selection in Relational Database Systems", Feb. 1988, vol. 30, pp. 420–421).

* cited by examiner

Primary Examiner—Diane D. Mizrahi
Assistant Examiner—Apu M Mofiz
(74) Attorney, Agent, or Firm—Oblon, Spivak, McClelland, Maier & Neustadt, P.C.

(57) ABSTRACT

A data storage and retrieval system includes a data space area where a set of data belonging to a predetermined category and definition data describing definition of the structure and the presentation form of the data are stored, a data space retrieval section for retrieving data and definition data made to correspond to the data from the data space area, a data space operation section for rewriting the definition data made to correspond to the data retrieved by the retrieval section on the basis of another definition data stored in the data space area, and a display for displaying the data retrieved by the retrieval section on the basis of the definition data rewritten by the operation section.

24 Claims, 33 Drawing Sheets

```
Def_Inf{
  var infoSpace X;
  Access 2331231;
  Display 3Dspace,();
  .........
                                          } DATA SPACE
                                            DESCRIPTION
                                            PORTION For X{
Def_Class Sell{
  Access 43224
  var Date date;
  var Text shop;
  var Text goods;
  var int sold;
  Display 3Dplot({"DATE","SHOP","GOODS",...}
{date,shop,goods,...}Figure);
  Event Clicked show_sell();           } DATA CLASS
  Method show cell();                    DESCRIPTION
  }                                      PORTION
  .........
}
```

| RELATION NAME | SOURCE CLASS | DESTINATION CLASS | SOURCE ROLE | DESTINATION ROLE | INTERATTRIBUTE CONSTRAINT |
|---|---|---|---|---|---|
| [EDIT OPERATION] | [PERSON] | [PUBLICATION] | "OBJECT TO BE EDITED" | "EDITOR" | ABSENT |

FIG. 17

| NAME | NUMBER OF LINES |
|---|---|
| RELATED TEXT#1.NAME | RELATED TEXT#1.NUMBER OF LINES |
| RELATED TEXT#2.NAME | RELATED TEXT#2.NUMBER OF LINES |
| RELATED TEXT#3.NAME | RELATED TEXT#3.NUMBER OF LINES |

FIG. 20

| RELATION NAME, | SOURCE CLASS, | DESTINATION CLASS, | SOURCE ROLE, | DESTINATION ROLE, | INTERATTRIBUTE CONSTRAINT |
|---|---|---|---|---|---|
| [SECTION ITEM RELATION] | [SECTION ITEM] | [REPORT] | "MAIN TEXT" | "SUBTEXT" | "[SECTION ITEM].REPORT←[REPORT].NAME" |
| [MANAGEMENT OPERATION] | [PERSON] | [MANAGEMENT] | "MANAGE" | "MANAGED" | |

FIG. 21

| | SYMBOL | MEANING |
|---|---|---|
| ATTRIBUTE TYPE | SingleValue | ···SINGLE VALUE |
| | List | ···LIST OF SINGLE VALUES |
| | Table | ···TABLE OF SINGLE VALUES |
| ATTRIBUTE VALUE TYPE | STRING | CHARACTER STRING |
| | NUM | NUMBER |
| | IdIndex | INDIRECT DATA INDEX INFORMATION |
| | ObjectRef | REFERENCE DATA TO OBJECT |
| | DataRef | REFERENCE DATA TO MANAGED DATA |
| | DataIndex | DATA INDEX DATA |
| | | {DATA TYPE, ACCESS TYPE, ACCESS FUNCTION, ARGUMENT} |

FIG. 18

```
CLASS DEFENITION
ATTRIBUTE    ATTRIBUTE     ATTRIEBUTE       INITIAL    ACCESS
NAME         TYPE          VALUE TYPE       VALUE      RIGHT

[UNIVERSE]
  +NAME           SINGLE VALUE,STRING
  +DATA           SINGLE VALUE,DataRef,,,rw

[TEXT] is_a UNIVERSE
  +TITLE          SINGLE VALUE,IdIndex,     "{name}",
  oauthor

[SECTION ITEM] is_a TEXT
  +CONTENTS       SINGLE VALUE,DataIndex,"{doc,read,
                    GetContents,null},{doc,write,
                    PutContents,null}",rw
  +NUMBER OF      SINGLE VALUE,DataIndex,"{doc,read,line,
    LINES           VALUE}",r
  +ABSTRACT       SINGLE VALUE,DataIndex,{doc,read,abstract,
                    VALUE}",r
  +AUTHOR NAME    SINGLE VALUE,IdIndex,"{AUTHOR,NAME}",rw
  +COMMENT        SINGLE VALUE,STRING,"",rw
  oMAIN TEXT

[DOCUMENT] is_a TEXT
  +MANAGER NAME   SINGLE VALUE,IdIndex,"{MANAGER.NAME}"
  +MANAGER        SINGLE VALUE,IdIndex,"{author}"
  oSUBTEXT

[OPERATION] is a UNIVERSE
  +NAME           SINGLE VALUE,           STRING,,
  oOBJECT TO BE OPERATED
  oOPERATOR

[MANAGEMENT OPERATION] is_a OPERATION
  +PROGRESS       TABLE,IdIndex,"{RELATED TEXT.<name=key,
                    NUMBER OF LINES>}"
  +RELATED TEXT   LIST,IdIndex,"{OBJECT TO BE MANAGED.
                    SUBTEXT}"
  oOBJECT TO BE MANAGED

[PERSON] is_a UNIVERSE
  +SEX            SINGLE VALUE,           STRING
```

FIG. 19

FIG. 22A
```
MODULE NAME=publish_sec1
OBJECT TO BE MONITORED          CHANGE NOTIFICATION MEANS, MONITOR INDEX
SECTION1                        mediator_sec1, NUMBER OF LINES
```

FIG. 22B
```
MODULE NAME=med_no1
NOTIFICATION SOURCE, COUNTERPART TO BE NOTIFIED, OTHER REFERENCE INFORMATION,
ARITHMETIC EXPRESSION
pub_no1, sub_all, pub_no2, pub_mat, SUM(pub_no1, pub_no2, pub_mat)
pub_no2, sub_all, pub_no1, pub_mat, SUM(pub_no1, pub_no2, pub_mat)
pub_mat, sub_all, pub_no1, pub_no2, SUM(pub_no1, pub_no2, pub_mat)
```

FIG. 22C
```
MODULE NAME=sub_all
OBJECT TO BE REFLECTED,         CHANGE NOTIFICATION MEANS, REFLECTION INDEX
REPORT,                         med_no1, TOTAL NUMBER OF LINES
```

```
objectCreate([DOCUMENT],'REPORT')
objectCreate([TEXT],'SECTION 1')
objectCreate([TEXT],'SECTION 2')
objectCreate([TEXT],'SYNOPSIS')
objectCreate([MANAGEMENT OPERATION],'REPORT
   CREATION MANAGEMENT')
objectCreate([PERSON],'MR.A')
objectCreate([PERSON],'MR.B')
objectCreate([PERSON],'MR.C')
objectCreate([PERSON],'MR.D')
objectCreate([OPERATION],'REPORT CREATION')

relationAssert('REPORT','SECTION 1',MAIN TEXT)
relationAssert('REPORT','SECTION 2',MAIN TEXT)
relationAssert('REPORT','SYNOPSIS',MAIN TEXT)
relationAssert('SECTION1','MR.A',AUTHOR)
relationAssert('SECTION 2','MR.B",AUTHOR)
relationAssert('SYNOPSIS','MR.C',AUTHOR)
relationAssert('REPORT',MR.D',MAIN AUTHOR)
relationAssert('REPORT CREATION','MR.D',OPERATOR)
relationAssert('REPORT CREATION','REPORT',OBJECT TO
   BE OPARATED)
relationAssert('REPORT SECTION MANAGEMENT','REPORT',
   OBJECT TO BE MANAGED)
```

```
dataRegistor ('SECTION 1'.DATA, section 1.doc);
dataRegistor ('SECTION 2'.DATA, section 1.doc);
dataRegistor ('SYNOPSIS'.DATA, matome.doc);
dataRegistor ('REPORT'.DATA, report.doc);
```

FIG. 25

| STORAGE POSITION DEFINITION, | ATTRIBUTE VALUE |
|---|---|
| 'SECTION 1' #TITLE, | SECTION 1 |
| 'SECTION 1' #DATA, | section 1.obj |
| 'SECTION 1' #NAME, | SECTION 1 |
| 'SECTION 1' #CONTENTS, | "FIRST,THIS TEXT IS..." |
| 'SECTION 1' #NUMBER OF LINES, | 10; |
| 'SECTION 1' #ABSTRACT, | "FIRST" |
| 'SECTION 1' #AUTHOR NAME, | A |
| 'SECTION 1' #COMMENT, | NULL |
| 'SECTION 1' #AUTHOR, | A |
| 'SECTION 1' #MAIN TEXT, | 'REPORT' |

FIG. 27A  OBJECT 1, OBJECT 2, RELATION NAME
         REPORT, SECTION 1, MAIN TEXT

FIG. 27B  'REPORT'
          +SUBTEXT, ObjectRef, 'SECTION 1'

FIG. 27C  'SECTION 1'
          +MAIN TEXT, ObjectRef, 'REPORT'

```
'REPORT'
  +PERSON IN CHARGE, SINGLE VALUE, IdIndex,
    "PERSON IN CHARGE IS {AUTHOR}
```

```
'REPORT'
  +TOTAL NUMBER OF LINES,    SINGLE VALUE,
    IdIndex,"SUM({SUBTEXT.NUMBER OF LINES})"
```

```
'REPORT CREATION MANAGEMENT'
  +PROGRESS    TABLE,IdIndex,"(RELATED TEXT
  <NAME=key,NUMBER OF LINES>}"
```

FIG. 32

| STORAGE POSITION DEFINITION | VALUE | |
|---|---|---|
| 'REPORT CREATION MANAGEMENT' | #PROGRESS#1#1 | 'SECTION 1' |
| 'REPORT CREATION MANAGEMENT' | #PROGRESS#1#2 | 10 |
| 'REPORT CREATION MANAGEMENT' | #PROGRESS#2#1 | 'SECTION 2' |
| 'REPORT CREATION MANAGEMENT' | #PROGRESS#2#2 | 20 |

FIG. 33

| OBJECT NAME='REPORT CREATION MANAGEMENT' | | |
|---|---|---|
| 'REPORT CREATION MANAGEMENT'. PROGRESS.SECTION 1.NAME | 'REPORT CREATION' #PROGRESS#1#1 | MANAGEMENT |
| 'REPORT CREATION MANAGEMENT'. PROGRESS.SECTION 1. NUMBER OF LINES | 'REPORT CREATION' #PROGRESS#1#2 | MANAGEMENT |
| 'REPORT CREATION MANAGEMENT'. PROGRESS.SECTION 2.NAME | 'REPORT CREATION' #PROGRESS#2#1 | MANAGEMENT |
| 'REPORT CREATION MANAGEMENT'. PROGRESS.SECTION 2.NAME NUMBER OF LINES | 'REPORT CREATION' #PROGRESS#2#2 | MANAGEMENT |

FIG. 34

```
{ STORAGE POSITION        ATTRIBUTE VALUE
  INFORMATION             "THIS SECTION REQUIRES
    'SECTION 1' #COMMENT  CONSIDERABLE CORRECTION
```

```
{ DATA    ACCESS   FUNCTION      FUNCTION
  TYPE,   TYPE,    NAME,         POINTER
  ─────────────────────────────────────────────
  doc,    read,    abstract,     *abstract
  doc,    write,   NA,           --
  doc,    read,    Getcontents,  *Getcontects
  doc,    write,   Putcontents,  *Putcontents
```

```
[DOCUMENT MANAGEMENT OPERATION] is_a MANAGEMENT
 +NAME              IdIndex,       "{TEXT TO BE PROCESSED}MANAGEMENT OPERATION"
 +TEXT TO BE PROCESSED  objectRef, ""
 +PROGRESS          STRING,        "INITIAL STATE"
 +PROGRESS REPORT   IdIndex,       "PROGRESS OF TEXT {NAME} IS {PROGRESS} AND
                                    {OBJECT. NUMBER OF LINES}

[TOTAL MANAGEMENT OPERATION] is_a MANAGEMENT
 +NAME              STRING,
 +STATE             SINGLE VALUE,  IdIndex,    "Judge({RELATED OPERATION})"
 +RELATED OPERATION LIST,          objectRef,  ""
 +RELATED DOCUMENT  LIST,          IdIndex,    "{RELATED OPERATION.DOCUMENT
                                                TO BE PROCESSED}"
 +PROGRESS          TABLE,         IdIndex,    "{RELATED OPERATION<DOCUMENT
                                                TO BE PROCESSED.NAME,PROGRESS>}"
 +MANAGER           SINGLE VALUE,  IdIndex,    "{OPERATION.MANAGER}"
 +ABRIDGED TRANSLATION SINGLE VALUE, IdIndex,  "Append({RELATED TEXT,ABSTRACT})"
```

F I G. 4 3

1. [TEXT MANAGEMENT OPERATION] OBJECT X IS MADE TO CORRESPOND TO ALL [TEXT] OBJECTS, AND REFERENCE OF SOURCE OBJECT IS INSERTED INTO ATTRIBUTE=" [TEXT MANAGEMENT OPERATION] OBJECT X. TEXT TO BE PROCESSED"

2. ONE [TOTAL MANAGEMENT OPERATION] OBJECT Y IS MADE TO CORRESPOND TO ALL TEXT MANAGEMENT, AND REFERENCE OF SOURCE OBJECT IS INSERTED INTO ATTRIBUTE "[TOTAL MANAGEMENT OPERATION] OBJECT Y. RELATED OPERATION"

FIG. 44

[DOCUMENT MANAGEMENT OPERATION]
+NAME               SECTION 1 MANAGEMENT OPERATION
+TEXT TO BE PROCESSED   'SECTION 1'
+PROGRESS           END
+PROGRESS REPORT    PROGRESS OF TEXT FIRST SECTION IN TEXT IS 10 LINES AT END

[TOTAL MANAGEMENT OPERATION]
+NAME               "REPORT CREATION MANAGEMENT"
+STATE              DURING OPERATION
+PROGRESS           NAME                STATE
                    "SECTION 1"         END
                    "SECTION 2"         DURING OPERATION
                    "SYNOPSIS"          DURING OPERATION
+ABSTRACT           FIRST, PROBLEM WAS POINTED OUT. SOLUTION WAS PRESENTED,
                    AND EXPERIMENT WAS CONDUCTED. EVALUATION WAS PERFORMED.
+RELATED DOCUMENT   ('SECTION 1', 'SECTION 2', 'SYNOPSIS')
○MANAGER            D

FIG. 45

OBJECT-ORIENTED DATA STORAGE AND RETRIEVAL SYSTEM USING INDEX TABLE

This application is a Division of application Ser. No. 09/176,317 Filed on Oct. 22, 1998 now U.S. Pat. No. 6,539,388, the contents of which are incorporated herein by reference.

BACKGROUND OF THE INVENTION

The present invention relates to a data storage and retrieval system for retrieving data distributed and stored on a network and presenting the retrieved data by a user-desired presentation form.

This application is based on Japanese Patent Application No. 9-289770, filed Oct. 22, 1997 and Japanese Patent Application No. 9-307460, filed Nov. 10, 1997, the contents of which are incorporated herein by reference.

Generally, data is based on a personal intention and interpretation. Because of the personal preference, data to be provided is constructed from the viewpoint based on the data provider. The provider constructs data to maximize the utility function of the provider and provides the data. A user to which the data is provided also has a utility function and a demand for referring to and processing the data to maximize the utility function of the user.

The architecture of a recent database system is modeled as a three-layer schema. An external schema layer is closest to the application layer of the three-layer schema. This layer provides a specific method (view or presentation form) of viewing a data structure as part of a database to a specific user (or group). Such a database system places prominence to prevent a physical or logical change in the data structure from influencing on the application software rather than to reconstruct the retrieved data in accordance with the viewpoint of the user.

In the conventional framework of database, an end user is not allowed to freely manipulate the view for the database, and no mechanism is available to allow a plurality of users to share view for the database. That is, only viewing based on the database developer/manager is present. The view is associated with not data expression or data behavior but the data structure. As described above, with the conventional view for the database, the data can hardly be reconstructed in accordance with the viewpoint of the user in the true sense.

BRIEF SUMMARY OF THE INVENTION

It is an object of the present invention to provide a data storage and retrieval system which allows a user to freely change the data presentation form from his/her viewpoint to widen the data utilization and promotes data utilization, and a recording medium recording a computer program for data storage and retrieval.

According to an aspect of the present invention, there is provided a data storage and retrieval system comprising storage means for storing data belonging to a predetermined category and definition data which is made to correspond to the data in advance and describes definitions of a data structure and presentation form, retrieval means for retrieving the data and the definition data made to correspond to the data in advance from the storage means on the basis of input retrieval data, rewrite means for rewriting, based on another definition data stored in the storage means, the definition data made to correspond in advance to data retrieved by the retrieval means, and presentation means for presenting, based on the definition data rewritten by the rewrite means, the data retrieved by the retrieval means.

This arrangement allows not only to simply retrieve and present a data space but also to easily display the data in a display form desired by a user by rewriting the definition data of the retrieved data using another definition data.

According to another aspect of the present invention, there is provided a data storage and retrieval system comprising storage means for storing data belonging to a predetermined category and definition data describing definitions of a structure and presentation form of the data, retrieval means for retrieving presentable data from the storage means on the basis of designated definition data, and presentation means for presenting, based on the designated definition data, the data retrieved by the retrieval means.

This arrangement allows not only to simply retrieve and present a data space but also to retrieve and present data matching a presentation form desired by a user.

Additional objects, and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 17 is a view showing an example of relation definition;

FIG. 18 is a view showing contents of an attribute type and attribute value type in the second embodiment;

FIG. 19 is a view showing the contents of a class definition table;

FIG. 20 is a view showing an example of expansion when the attribute value is a table;

FIG. 21 is a view showing the contents of a relation definition table;

FIGS. 22A, 22B, and 22C are views showing the contents of tables used by a change management section;

FIG. 23 is a view showing the contents of an initialization file for an object management section;

FIG. 24 is a view showing function definitions for data registration;

FIG. 25 is a view showing part of contents of an attribute value recording table;

FIGS. 27A, 27B, and 27C are views showing table entries added in relation insertion;

FIG. 32 is a view showing an example of attribute definition when the attribute type is a table;

FIG. 33 is a view showing part of contents of the attribute value recording table;

FIG. 34 is a view showing part of contents of a storage position management table;

FIG. 43 is a view showing an example of new class definition;

FIG. 44 is a view showing the defined contents of an interclass data translation rule table; and FIG. 45 is a view showing the contents of a generated virtual instance.

DETAILED DESCRIPTION OF THE INVENTION

Embodiments of a data storage and retrieval system according to the present invention will be described below with reference to the accompanying drawing.

Figure 1:
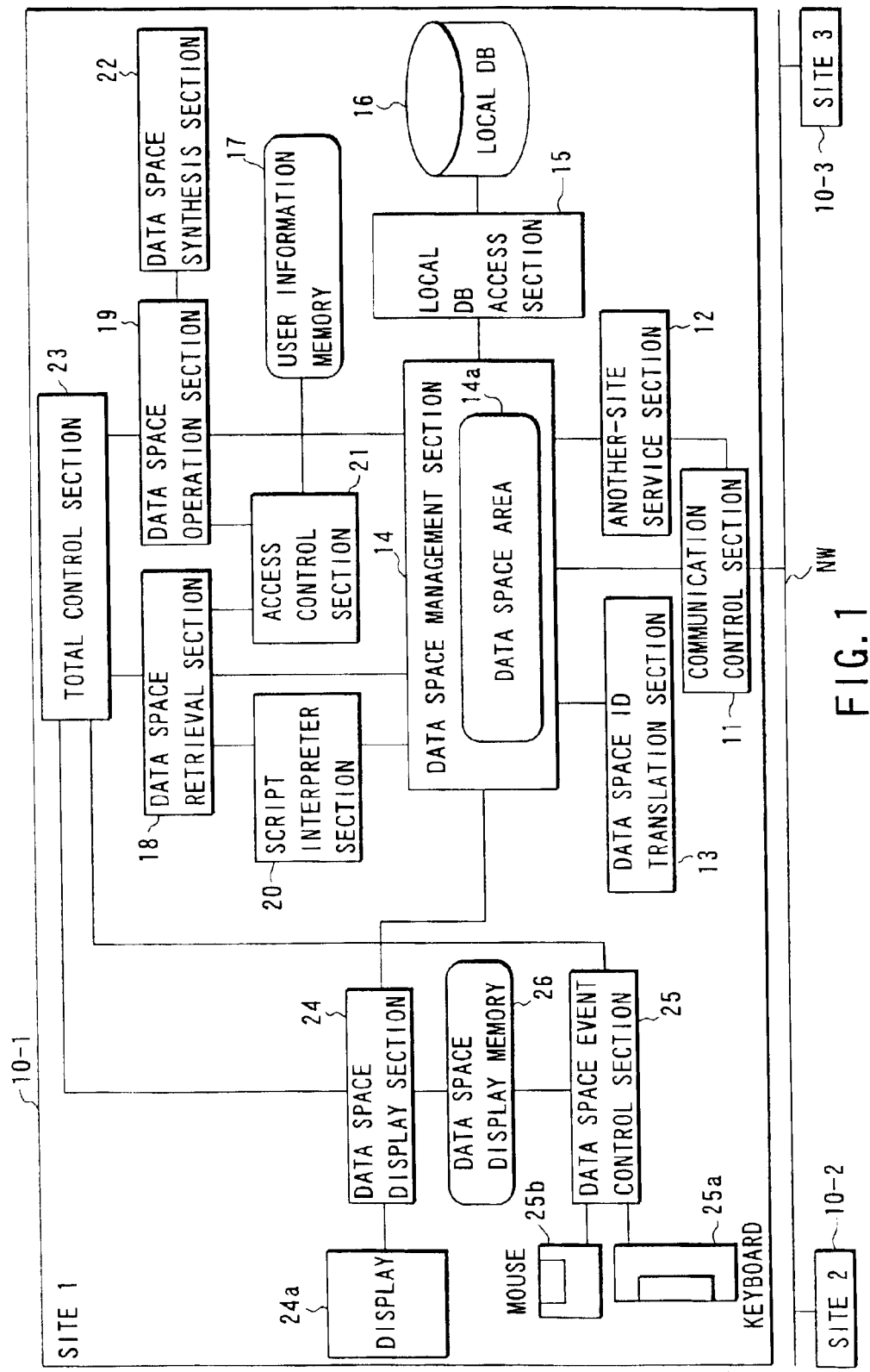
FIG. 1 is a block diagram showing the arrangement of a data storage and retrieval system according to the first embodiment of the present invention.

FIG. 1 shows a data storage and retrieval system constituted by connecting a number of database systems through a network. In this case, three database systems (to be referred to as a first, second, and third sites hereinafter) 10-1, 10-2, and 10-3 are connected to a network NW. A data-distributed database system having a set of virtual data spaces in which data stored in a local database (DB) 16 of each site is shared by the remaining sites through the network is constituted. All the sites have the same arrangement. FIG. 1 shows the arrangement of the first site 10-1.

Terms used in the following description will be described.

A data space means a set of data collected in accordance with a certain viewpoint, i.e., a set of data objects and is constituted by a description for defining the data structure (data class) and presentation form (expression method) of the data objects, which are made to correspond to the set of the data objects, i.e., data definition objects (schema). The data space is physically embodied by files. The data space is sometimes formed from only data definition objects.

The first site 10-1 mainly comprises a communication control section 11, an another-site service section 12, a data space ID translation section 13, a data space management section 14, a local database (DB) 16, a local DB access section 15, a user data memory 17, a data space retrieval section 18, a data space operation section 19, a script interpreter section 20, an access control section 21, a data space synthesis section 22, a total control section 23, a data space display section 24, a data space event control section 25, and a data space display memory 26. The data space display section 24 is connected to a data presentation device such as a display 24a. The data space event control section 25 is connected to data input devices such as a keyboard 25a and a mouse 25b. The second site 10-2 or 10-3 has the same arrangement as that of the first site 10-1.

The communication control section 11 connects a logical path to another site when a data space in the self site is transferred to another site and performs interface processing in transferring a data space in the self site to another site or receiving a data space from another site.

When data of a data space in the self site, which is being referred to by another site, is changed, the another-site service section 12 transfers the data to another site to maintain the consistency of data between the sites.

The data space ID translation section 13 is called by the data space management section 14 to add specific IDs to a data space and data objects in the self site when data of the data space in the self site is to be expanded in a data space area 14a or data of the data space in another site is to be received and expanded in the data space area 14a. With the IDs, various data can be uniquely identified in the entire system.

The data space management section 14 manages the data space area 14a where local data of the data space in the self site and data of the data space of another site, which is transferred from another site, are expanded.

The local DB access section 15 is called by the data space management section 14 to acquire data of the data space in the self site from the local DB 16. The acquired data of the data space is expanded in the data space area 14a. The local DB access section 15 includes an interface used to access a DBMS (Database Management System).

The local DB 16 storing the data of the data space in the self site is mainly formed on a secondary storage.

The user data memory 17 stores data associated with the user who uses the first site 10-1.

The data space retrieval section 18 is called by the total control section 23 to retrieve data from the local DB 16 through the data space management section 14. More specifically, a data space, data object, or data definition object matching retrieved data (e.g., identification data represented by, e.g., a character string to identify a data space, data object, or data definition object) input by the user is retrieved.

The data space operation section 19 is called by the total control section 23 to newly generate or update data present in the data space area 14a. More specifically, the data space operation section 19 updates the value of a retrieved data space or data object, deletes the value, refers to a data definition object, or rewrites (overwrites) a data definition object.

The script interpreter section 20 is called by the data space retrieval section 18 and data space operation section 19 to translate and evaluate various scripts. More specifically, when a script in a retrieval request is to be translated and evaluated, the script interpreter section 20 is called by the data space retrieval section 18. When the data of a data object or data definition object is to be operated (the value is to be updated or overwritten), the script interpreter section 20 is called by the data space operation section 19.

The access control section 21 is called by the data space retrieval section 18 and data space operation section 19 to determine, on the basis of an access key (to be described later), whether the user can access a data space or data object, or on the basis of an identifier contained in a data definition object, whether the data definition object can be rewritten.

The data space synthesis section 22 is called by the data space operation section 19 to rewrite the description of a data definition object in overwriting the data definition object.

Upon acquiring instruction data (event) for instructing an operation of a data space input by the user through the data space event control section 25, i.e., data for instructing the data space display section 24 to display the data space on the display 24a, the data space retrieval section 18 to retrieve the data space, or the data space operation section 19 to operate the data space, the total control section 23 sends an operation instruction based on the instruction data and associated with the data space to the respective sections, thereby controlling the entire site.

The data space display section 24 is called by the total control section 23 to display a designated data space on, e.g., the display 24a.

The data space event control section 25 acquires an event input by the user through the mouse 25b or keyboard 25a on the basis of data displayed on, e.g., the display 24a and notifies the total control section 23 of generation of the event. For example, when a character string is input to request data space retrieval, or a data object displayed on the display 24a is selected by clicking the mouse, an event is generated.

The data space display memory 26 stores display data of the data space displayed on the display 24a.

Figure 2:
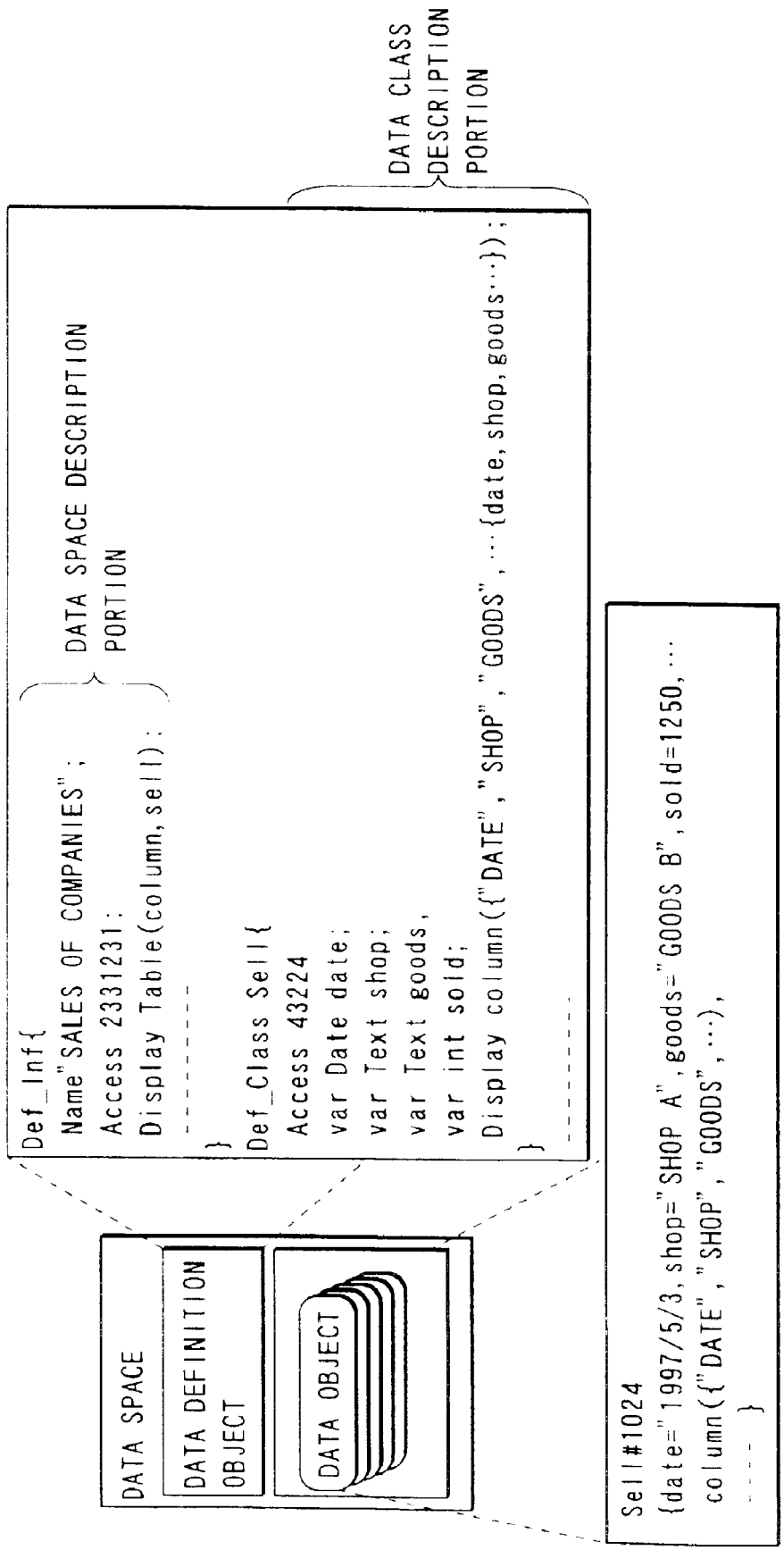
FIG. 2 is a view showing a specific example of a data space.

FIG. 2 is a view showing the structure of a data space in detail. FIG. 2 shows the structure of a data space named titled "sales of companies."

The data space shown in FIG. 2 has a set of data objects and a data definition object corresponding to the set of data objects. One of the plurality of data objects describes data with contents "on May 3, 1997, shop A sold goods B for 1,250 yen" in accordance with a predetermined description form. Operations and behaviors for the data may also be contained as a capsule of data objects.

In correspondence with data attributes determined in advance by the data structure defined by the data definition object (to be described later), i.e., "date," "shop," "goods," and "sold," the values of the data objects ("1997/5/3," "shop A," "goods B," and "1,250 yen" in the order of the above data attributes) are described.

The data definition object comprises a description portion "Def_Inf" associated with the data space, and a description portion "Def_Class: data class" associated with the data objects present in the data space.

In the description portion associated with the data space (to be referred to as a data space description portion hereinafter), the identifier (in FIG. 2, the identifier "Table" representing a table form) of the form of presenting the set of data objects is mainly described. In some cases, this identifier is described by a metavariable as a variable of the identifier of the data space or data class. The data space description portion also has data space identification data (in FIG. 2, the name represented by a character string "sales data space" is used as the data space identification data), and an access key (in FIG. 2, "2331231" is the access key) for defining user access to the data space (e.g., limiting users who can access the data space).

In the description portion associated with the data objects (to be referred to as a data class description portion hereinafter), the data class (the data class defines the data presentation form including the data structure of the data objects) of the data space is described. A data class identifier (in FIG. 2, "Sell" is the identifier of the data class) is also described. When the data space or data space template is to be overwritten (this will be described later), the data class identifier is also used to check whether the overwrite is allowed for the data class on the overwriting or overwritten side (whether the data structures match).

The data objects or data classes also have hierarchical relations. Generally, an inheritance function acts among such data with hierarchical relation. When an attribute which is not defined for data of lower class is accessed, and the attribute is defined for data of upper class, a result can be returned as if it were defined for the data of lower class.

In the data class description portion shown in FIG. 2, a routine "column" for displaying each data object as one column is described.

Figure 3:
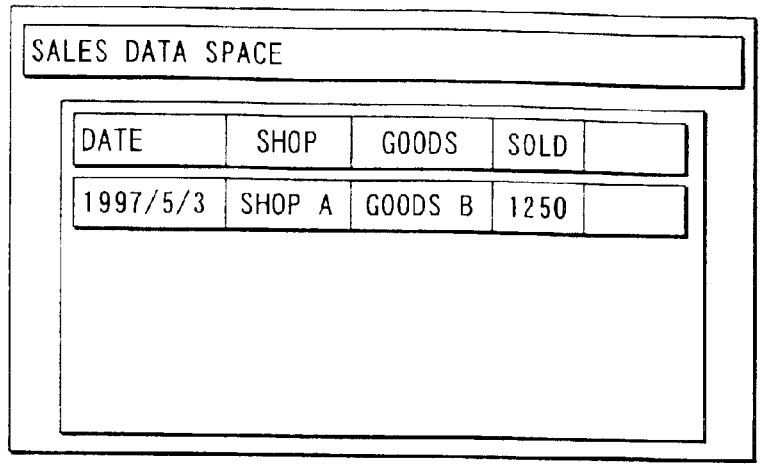
FIG. 3 is a view showing a display example of the data space shown in FIG. 2 on a display.

FIG. 3 shows a display example of the data space named "sales of companies" shown in FIG. 2 on the display 24a. One data space is displayed as one window on, e.g., the display 24a. As shown in FIG. 3, the set of data objects present on the data space is displayed in a table form in accordance with the description of the data definition object. Items displayed on the table are data attributes such as "date," "shop," "goods," and "sold." The data objects are displayed in a table form because the data space description portion and data class description portion of the data definition object define that one data object is displayed as one column, and all the columns are displayed as one column in the table form, as shown in FIG. 2.

The description form of the data object and data definition object as shown in FIG. 2 is merely an example and is not limited to this.

Various operations of the first embodiment having the above arrangement will be described next.

(1) Reference to Data Space

Figure 4:
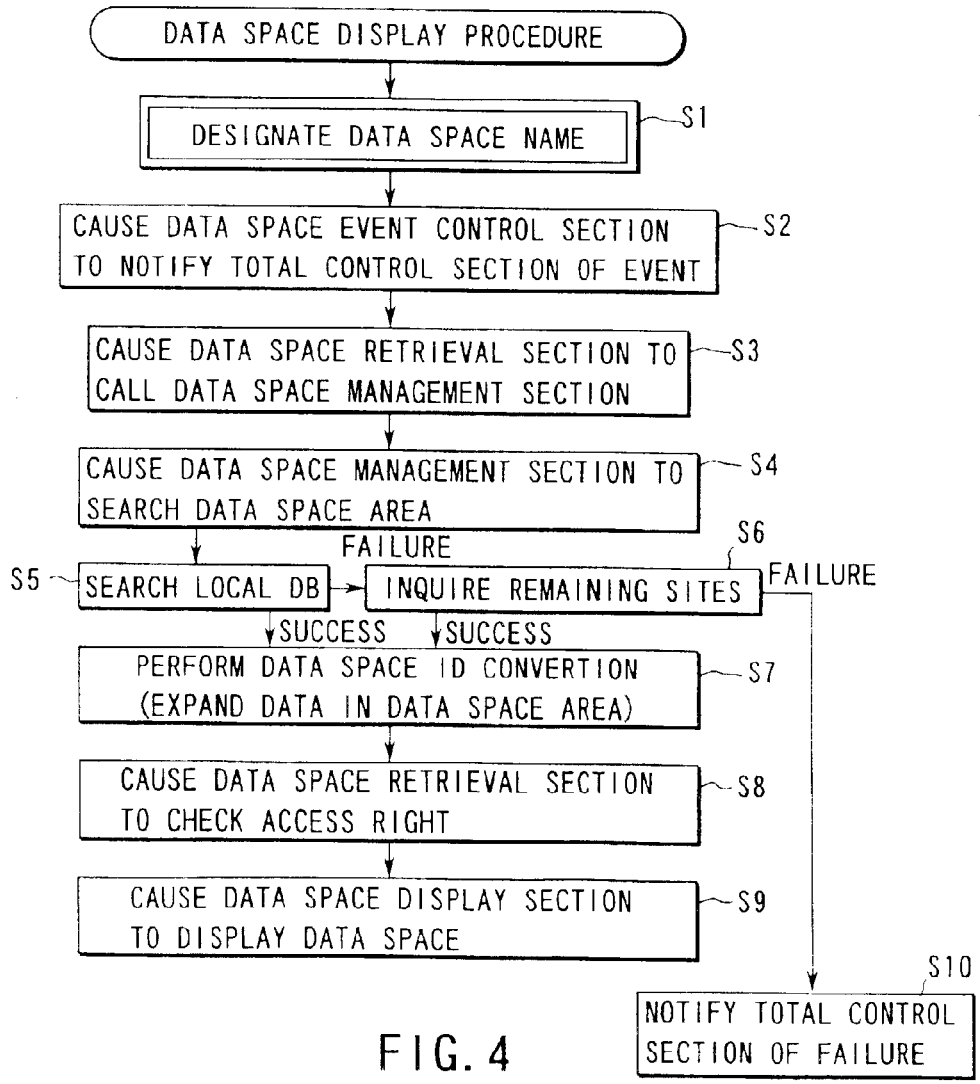
FIG. 4 is a flow chart for explaining a data space display procedure.

First, a processing procedure of retrieving a data space and displaying desired data on the display 24a will be described with reference to the flow chart shown in FIG. 4.

In step S1, the user inputs the name (character string) of a desired data space through the keyboard 25a on the basis of data displayed on, e.g., the display 24a to designate the data space and requests retrieval of the data space.

In step S2, the data space event control section 25 notifies the total control section 23 of generation of a retrieval event upon receiving the data space retrieval request.

In step S3, the total control section 23 calls the data space retrieval section 18 and also calls the data space management section 14 to access the data space area 14a.

In step S4, the data space management section 14 searches the data space area 14a. If the designated data space is not present in the data space area 14a, the data space management section 14 calls the local DB access section 15 to search the local DB 16 in step S5. If the designated data space is present in the local DB 16, the data of the designated data space is expanded from the local DB 16 onto the data space area 14a.

If it is found in step S5 that the designated data is not present in the local DB 16, the remaining sites 10-2 and 10-3 are inquired about the presence/absence of the designated data space in step S6. At this time, the remaining sites are notified of the name of the data space input by the user. When the designated data space is present in any one of the remaining sites, the data of the data space is transferred from another site to the data space area 14a of the self site and expanded. Data (e.g., the address of another site or broadcast address) necessary for accessing another site is managed by the communication control section 11.

When the designated data space is not present in the remaining sites either, the data space management section 14 notifies the total control section 23 of it in step S10. In response to this, the total control section 23 displays, on the display 24a, a message for notifying the user of the failure of data space retrieval.

When the presence of the designated data space to be expanded in the data space area 14a is confirmed in steps S5 and S6, the data space ID translation section 13 adds IDs unique to the self site, e.g., an ID (data space ID) to the data space or ID (data object ID) to a data object before the data of the data space is expanded in the data space area 14a in step S7. After this, the data of the data space is expanded in the data space area 14a.

In step S8, the data space retrieval section 18 calls the access control section 21 to collate an access key given in advance to the user who is accessing the data space, which is stored in the user data memory 17, with an access key (access key contained in the data definition object) given to the data space, thereby determining whether the user has an access right to the data space or, even if the user has the access right, whether the user access range is limited. If it is determined that the user can access the data space, the total control section 23 is notified of the data space ID and completion of data read operation of the designated data space.

In step S9, upon receiving this notification, the total control section 23 calls the data space display section 23 to display the designated data space on the window. The data space display method is described in the data definition object, so display is performed in accordance with the description.

When the inquiry about the designated data space is to be made for the remaining sites in step S6, a message therefor may be broadcasted to the remaining sites, or the remaining sites may be accessed using logical addresses for communication such as URLs given to data on the WWW (World-Wide Web). Alternatively, the remaining sites may be accessed through a server such as directory server for translating conceptual names into logical addresses for communication. In the present invention, the method of accessing the remaining sites is not particularly limited.

(2) Overwrite (Display) of Data Space

An overwrite of the data space will be described next.

Figures 5A, 5B:
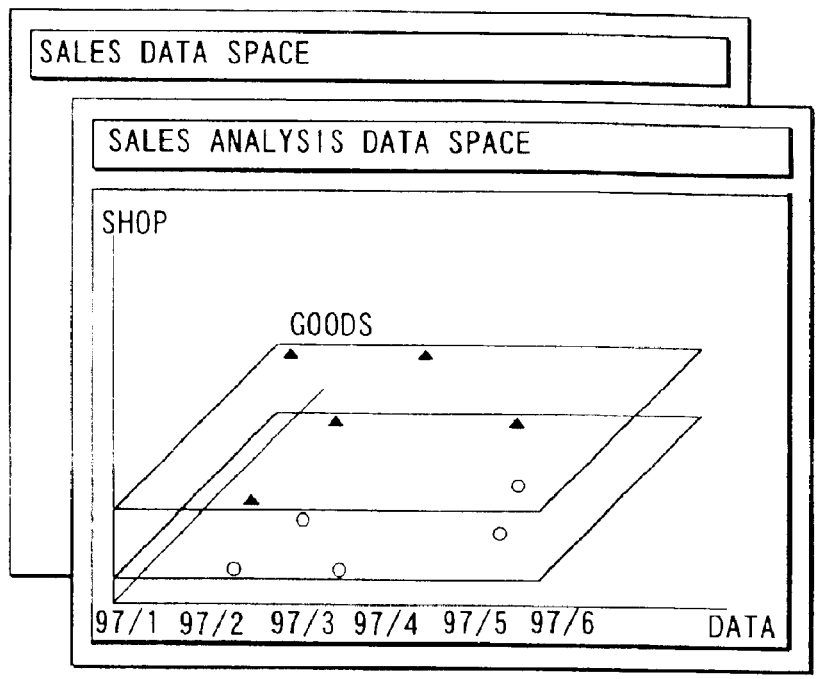
FIG. 5A is a view showing a display example in which a second data space is overwritten on a first data space.
FIG. 5B is a view showing a data definition object in overwriting the second data space on the first data space.

FIG. 5A shows a display example in overwriting another data space (second data space) on the data space (first data space) shown in FIG. 3. More specifically, FIG. 3 shows a display example of the data space named "sales data space" while FIG. 5A shows an example in which a data space template "sales analysis data space" is overwritten on the "sales data space" to change the data space display. Various data space templates are prepared, and a designated one of them is read out. There are two designation methods. (1) The function of the data space retrieval section 18 for retrieving a data space template suitable for the current target data space (in this case, the "sales data space") is used. The user selects a suitable data space template candidate from a menu. (2) A character string (in this case, "date" or the like) contained in the data space template is designated by the user, and the data space retrieval section 18 retrieves the data space template. The user selects a suitable data space template candidate from a menu.

In FIG. 3, the set of data objects on the data space is displayed in a table form. Items on the table are data attributes such as "date," "shop," "goods," and "sold." The data objects are displayed in the table form because the data space description portion and data class description portion of the data definition object define that one data object is displayed as one column, and all the columns are displayed as one column in the table form, as shown in FIG. 2.

In the data space obtained by overwriting two data spaces shown in FIG. 5A, the set of data objects present on the data space are visually arranged in a three-dimensional space. The X-, Y-, and Z-axes of the three-dimensional space represent "date axis," "shop axis," and "goods axis," respectively, so goods and the shop and date at which the goods have been sold are reflected on the data space in a visual display form.

Such display is possible because the second data space overlaps the first data space like a filter to translate the data space. The user can realize this operation by placing a window W2 corresponding to the second data space on a window W1 corresponding to the first data space.

FIG. 5B shows a description example of the data definition object of the first data space prepared by synthesizing the description of the data definition object of the first data space with that of the data definition object of the second data space by the data space synthesis section 22 when the second data space is overwritten on the first data space. Synthesis of descriptions is realized by, e.g., rewriting a replaceable portion (the replaceable portion is determined by the description of the data definition object of the second data space) in the description of the data definition object of the first data space to the description of the data definition object of the second data space.

Figure 6:
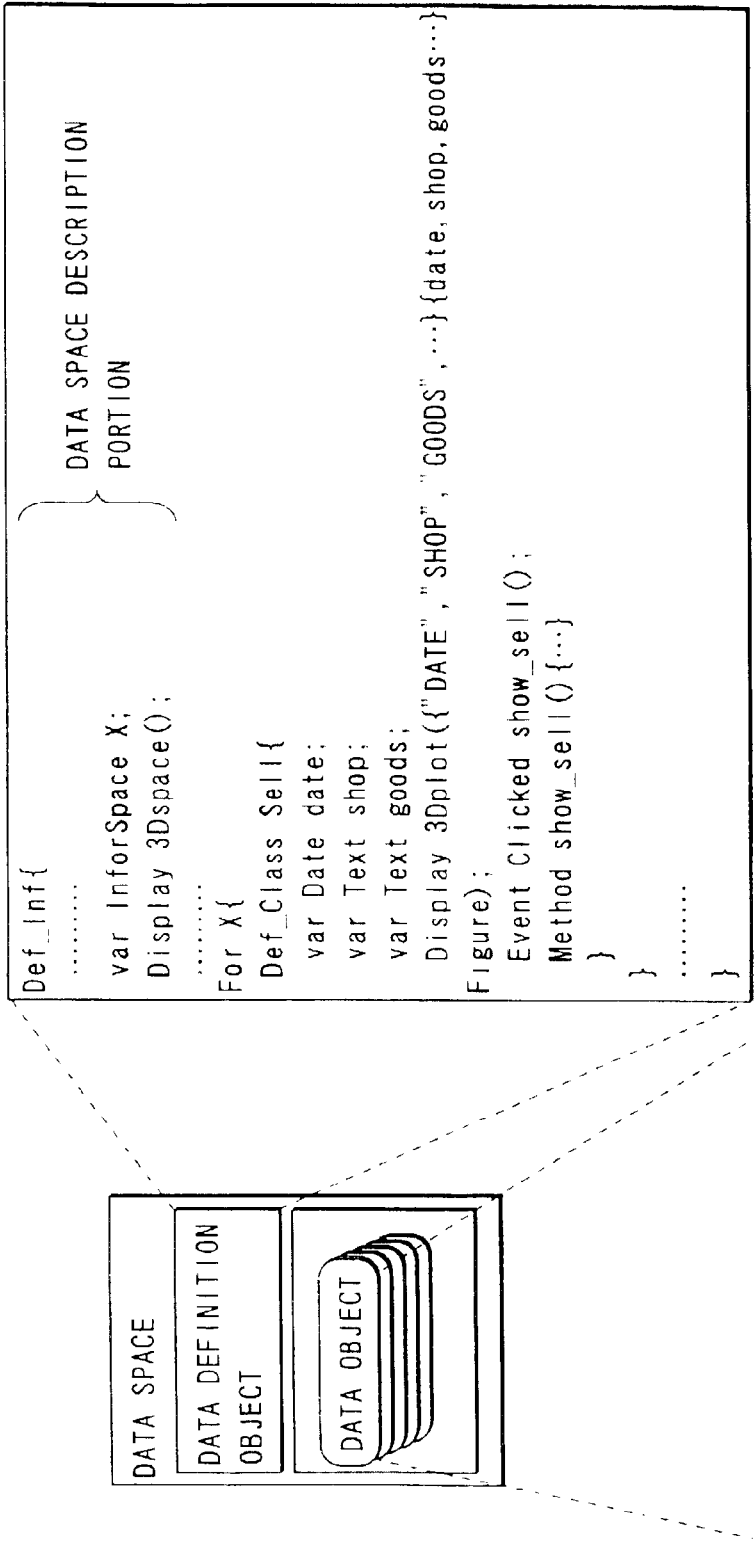
FIG. 6 is a view showing a specific example of the second data space in FIG. 5A.

FIG. 6 shows the structure of the second data space which has data objects and a data definition object, like the first data space.

In the data space description portion of the data definition object, a metadata space variable X "var InfoSpace X;" is declared as a data object presentation form, and additionally, "Display 3Dspace ( );" is designated as a data space presentation form in the three-dimensional space.

For the data class, in the data class description portion,

"For X/~Method show_sell ( ) { ... }}"

is described as a description of the metadata space variable X. This means that the data objects are three-dimensionally plotted along the date, shop, and goods axes on data space X. This also means that when a displayed plot is clicked with the mouse 25b or the like, the "show_sell" method is started.

When the window W2 corresponding to the second data space overlaps the window W1 corresponding to the first data space, the metadata space variable X is automatically bound to the first data space. When the data definition object (FIG. 6) of the second data space is overwritten on the data definition object (FIG. 2) of the first data space, the data definition object shown in FIG. 5B is generated.

The overwrite means that the data class definition described in the data class description portion is rewritten by (synthesized with) another data class definition. In correspondence with this, the description in the data space description portion may also be rewritten. By the mechanism of overwriting the data class, when the window W2 corresponding to the second data space is placed on the window W1 corresponding to the first data space by operating, e.g., the mouse 25b, the data space display form can be changed.

Figure 7:
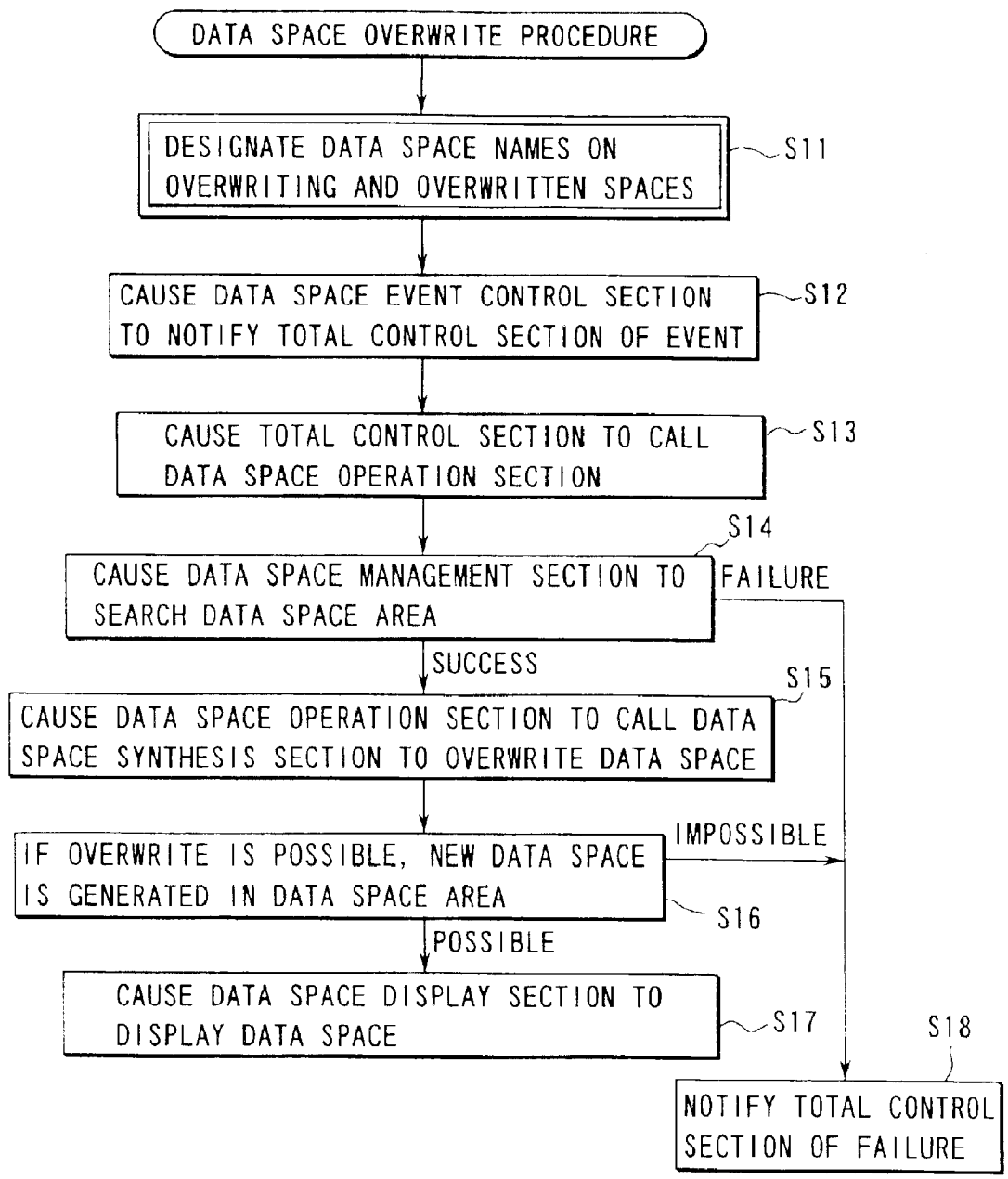
FIG. 7 is a flow chart for explaining a data space overwrite procedure.

A processing procedure of overwriting the data space will be described with reference to the flow chart shown in FIG. 7.

In step S11, the user inputs the names (character strings) of desired data spaces from the keyboard 25a on the basis of data displayed on the display 24a to designate the data spaces and requests to retrieve the data space to be overwritten and the overwriting data space.

In step S12, the data space event control section 25 notifies the total control section 23 of generation of an event of data space overwrite.

In step S13, the total control section 23 calls the data space operation section 19 and also calls the data space management section 14 to access the data space area 14a.

In step S14, the data space management section 14 searches the data space area 14a to acquire the data space to be overwritten and the overwriting data space.

In step S15, the data space operation section 19 calls the data space synthesis section 22 to execute the data space overwrite. At this time, data class identifiers on the overwriting and overwritten spaces are acquired and collated with each other. The access control section 21 checks whether each data space has an overwritable data structure and presentation form. If the identifiers of both the first and second data spaces are "Sell" and have the same data format, it is determined that the overwrite is possible.

In step S16, if the overwrite is possible, a new data space obtained by the overwrite is generated in the data space area 14a.

In step S17, the total control section 23 calls the data space display section 24 to display the overwritten data space on the display 24a as a window by using the data space ID obtained by the overwrite as a key.

In the above data space overwrite, whether the overwrite is possible is determined only by checking the data class identifiers. Alternatively, matching check of predetermined description contents in the data definition objects (e.g., check of date and text contents) may be executed.

(3) Merge of Data Space

A case wherein data defined by a plurality of data spaces are displayed on one data space will be described next. More specifically, a case wherein data object with different data classes on a plurality of data spaces are translated into the same form (data class) (i.e., the data structures are translated) and displayed on one data space will be described with reference to FIG. 8A.

Figure 8A:
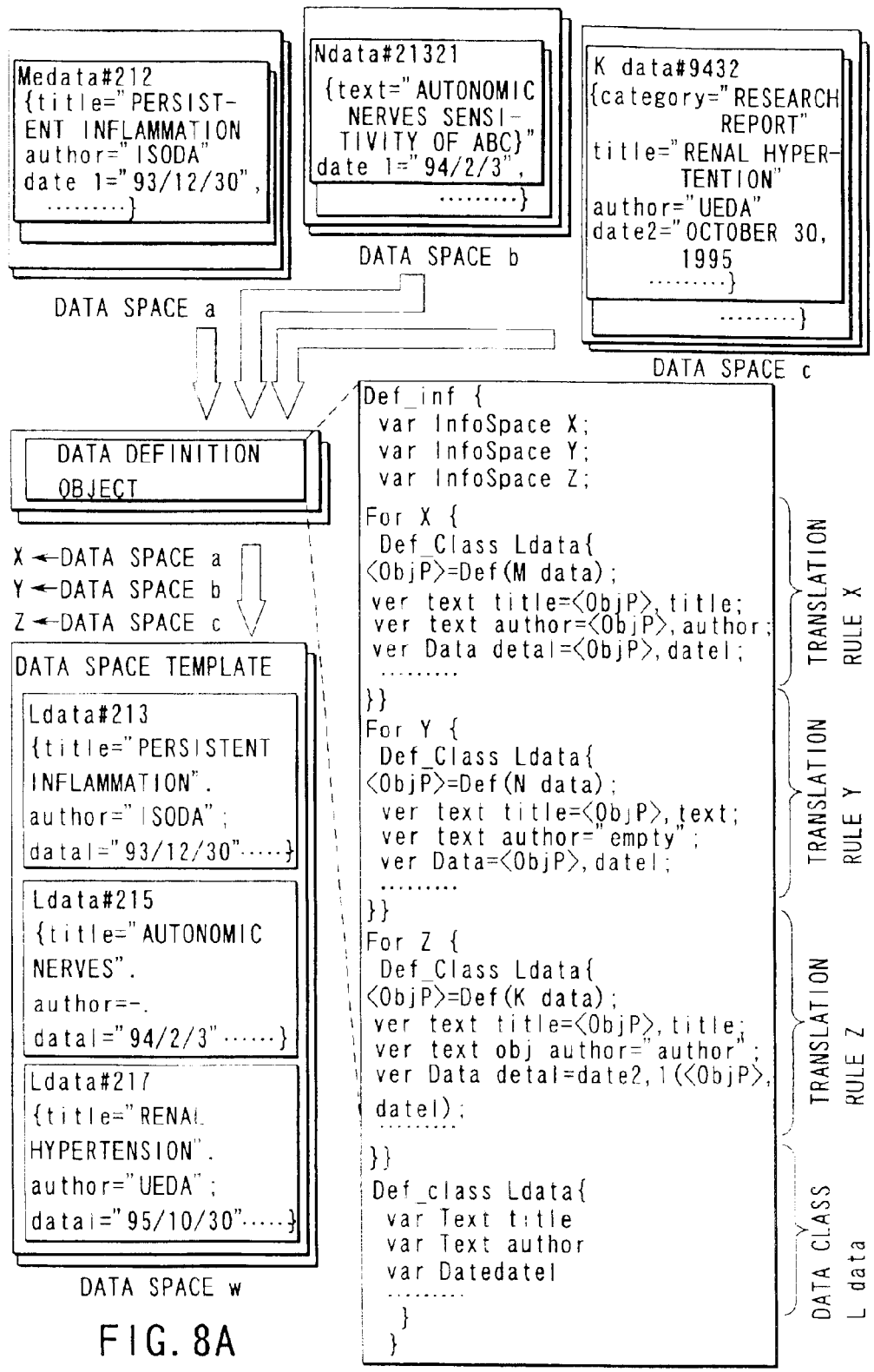
FIG. 8A is a view for explaining a case wherein data objects of different data classes on a plurality of data spaces are translated into data objects of the same form (data class) on one data space and displayed.

Referring to FIG. 8A, medical data having different data structures are present on data spaces X, Y, and Z, respectively. For example, some data have different date description form or no attributes. To absorb these differences, translation rules (more specifically, description contents of metadata space variables) X, Y, and Z for translating data structures are defined such that all the medical data have the same presentation form and data class definition corresponding to the data class "Ldata" of a predetermined data space W. These translation rules may be prepared by the user, or generated by someone and stored in the local DB in advance. For example, the translation rule Z defines translation from data class Kdata to data class Ldata. For the data attribute, the date display form is translated using a function "date2-1."

Figure 8B:
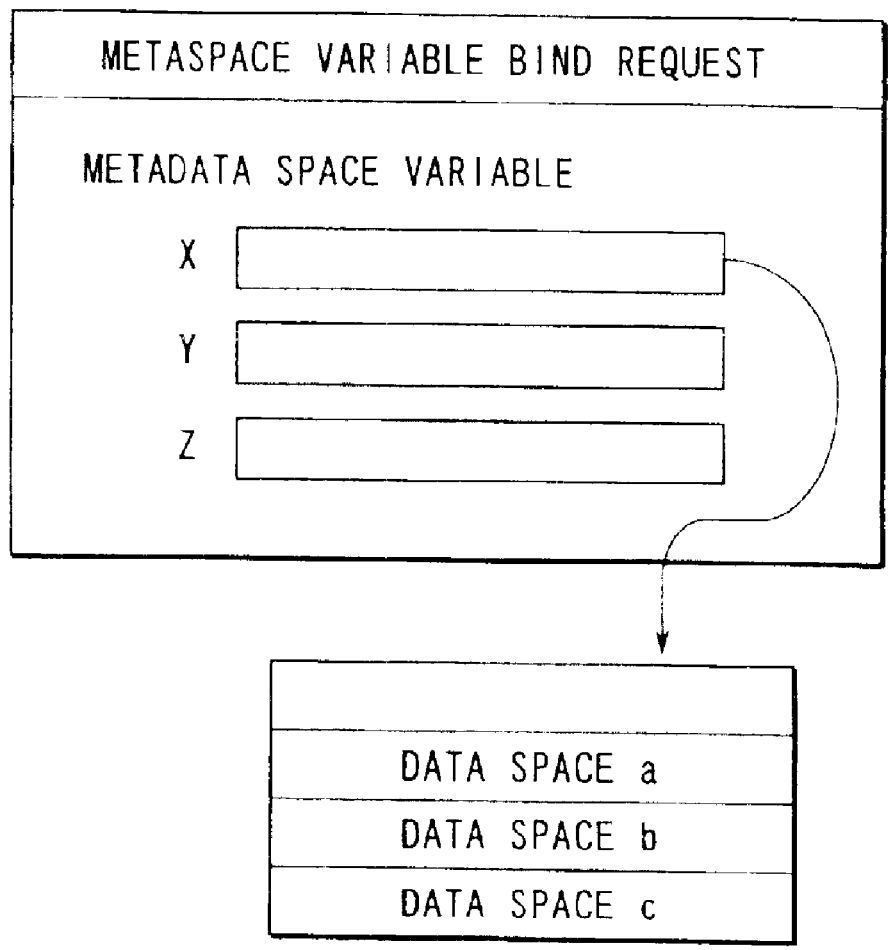
FIG. 8B is a view showing an inquiry of the user when binding to a metadata space variable cannot be specified.

In FIG. 5A, there is one data class to be translated, i.e., one metadata translation rule X. However, when two or more metadata translation rules are present, as in FIG. 8A, binding to the metadata space variable cannot be specified by the data space overwrite (display) operation described in (2). In this case, the user is inquired of binding, as shown in FIG. 8B. Assume that data space a corresponds to the metadata translation rule X, a data space b corresponds to the metadata translation rule Y, and a data space c corresponds to the metadata translation rule Z (metadata translation rule X←data space a, metadata translation rule Y←data space b, metadata translation rule Z←data space c). The data definition object of the data space a is overwritten using the description of the translation rule X, the data definition object of the data space b is overwritten using the description of the translation rule Y, and the data definition object of the data space c is overwritten using the description of the translation rule Z, thereby standardizing the data class definitions of the data spaces a, b, and c to the data class definition "Ldata" of the data space W.

(4) Overwrite of Data Space Template

The overwrite of a data space template will be described next.

A data space does not always have a data definition object and a set of data objects. Some data spaces have only data definition objects and no sets of data objects. Such an empty data space is called a data space template.

The data space template is the viewpoint for the sake of data. By using the data space template, the viewpoint for data and the know-how of utilization can be shared.

Figure 9:
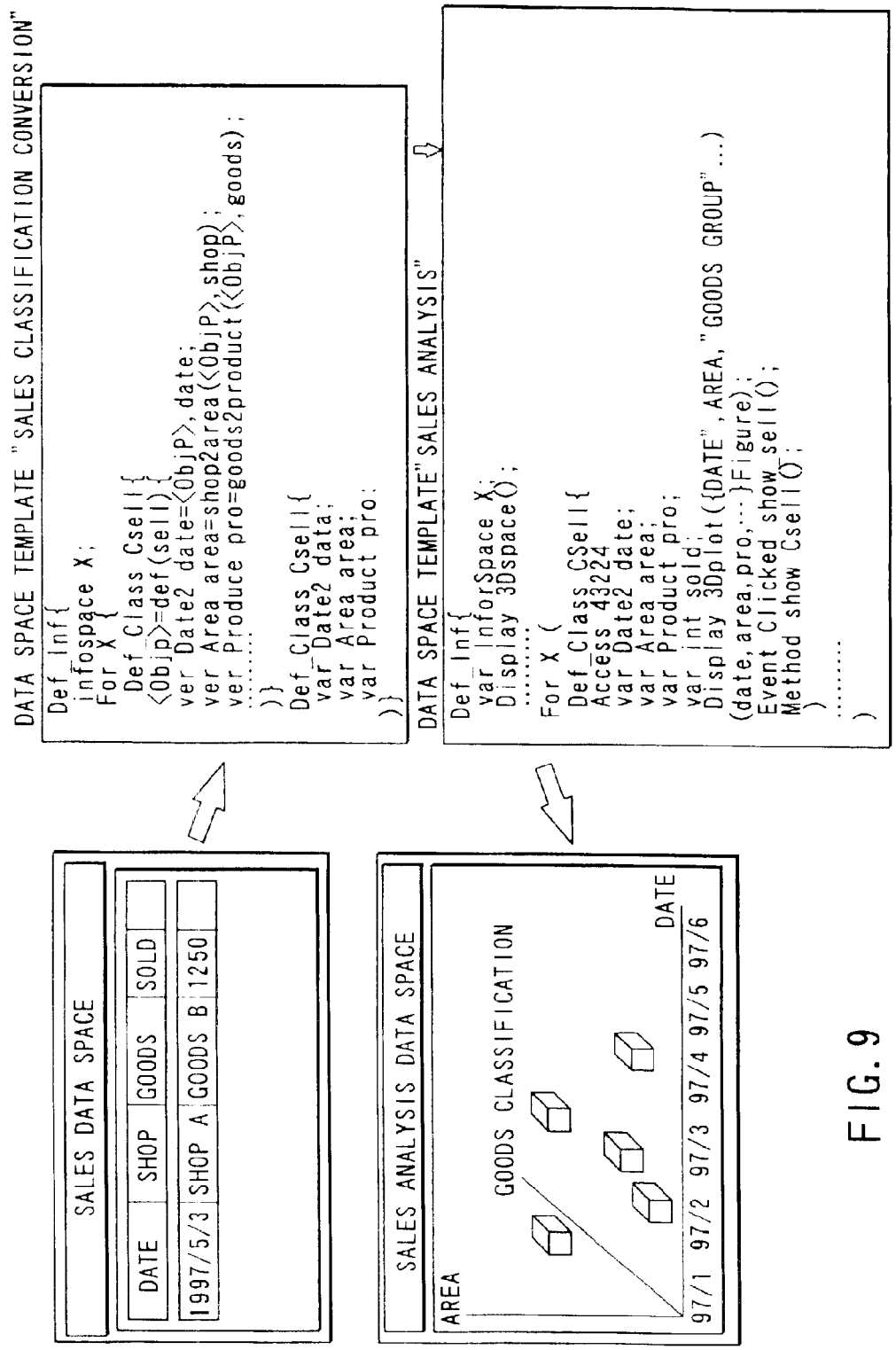
FIG. 9 is a view for explaining a case wherein the data space of a data space template is overwritten.

A case wherein a data space template is overwritten on a data space will be described with reference to FIG. 9. When a data space template "sales classification translation" designated by the input (or GIU) operation by the user is overwritten on a data definition object which has been made to correspond to a set of data objects as data associated with sales, present on a data space "sales data space," the data space having data attributes such as "date," "shop," and "goods" is translated into a data space having data attributes such as "date," "area," and "goods classification."

When a data space template "sales analysis" is further overwritten, the set of data objects present on the data space is translated into a "sales analysis data space" visually presented on a three-dimensional space. In the data space "sales analysis data space," the X-, Y-, and Z-axes of the three-dimensional space represent a "date axis," "area axis," and "goods axes," respectively, so goods and the area and date at which the goods have been sold are reflected on the data space in a visual display form.

Figure 10:
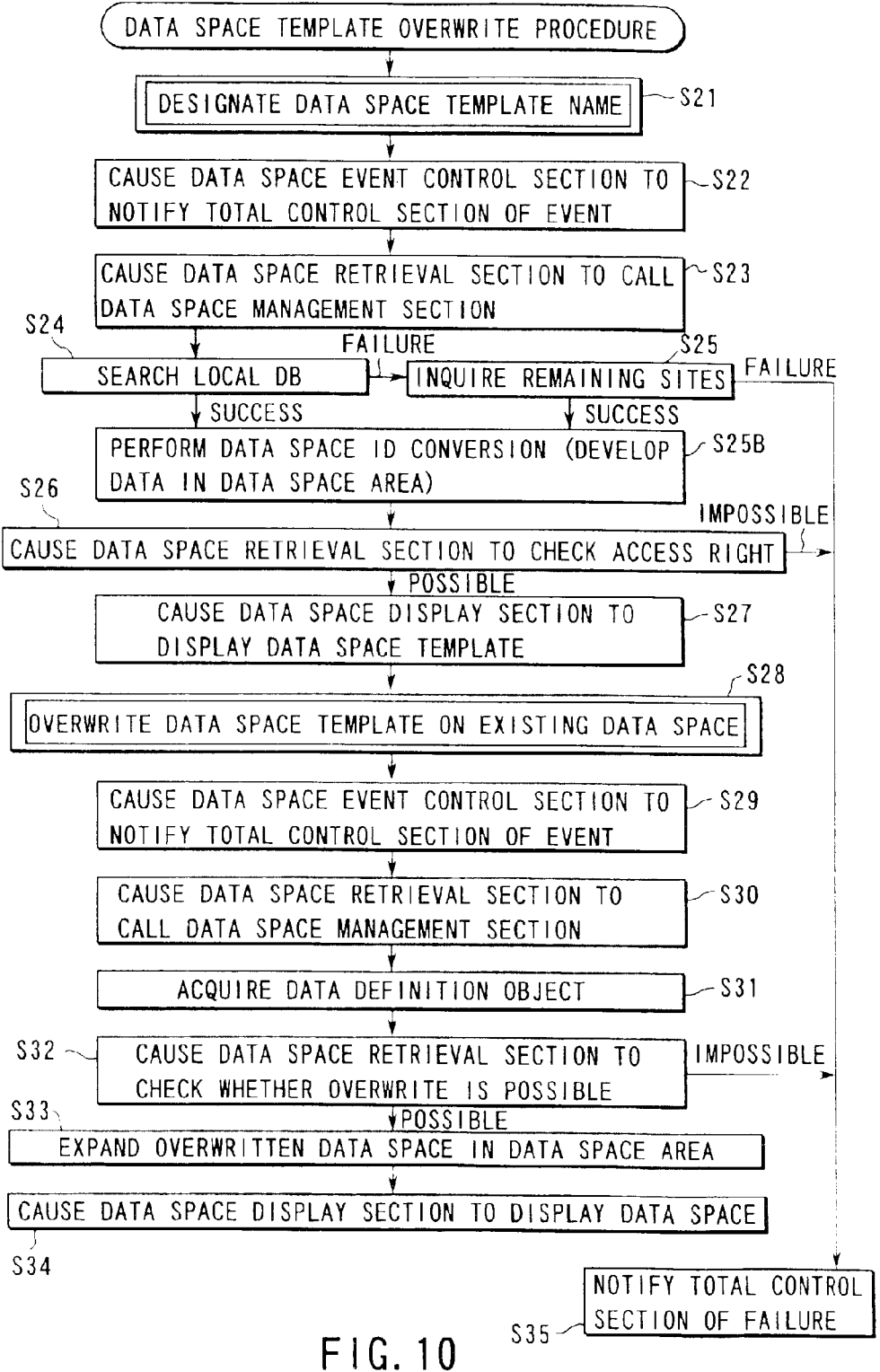
FIG. 10 is a flow chart for explaining a procedure of retrieving a data space template and overwriting it on another data space.

A processing procedure of overwriting a data space template on a data space will be described next with reference to the flow chart shown in FIG. 10. Assume that a desired data space has already been retrieved and presented on the display 24a.

In step S21, the user inputs the name (character string) of a desired data space template from the keyboard 25a on the basis of the data displayed on the display 24a to designate the data space template and requests to retrieve the data space template.

In step S22, the data space event control section 25 receives the data space retrieval request and notifies the total control section 23 of generation of an event of data space template retrieval.

In step S23, the total control section 23 calls the data space retrieval section 18 and also calls the data space management section 14 to access the data space area 14a.

In step S24, the data space management section 14 searches the data space area 14a. If the designated data space template is not present, the local DB access section 15 is called to search the local DB 16. If the designated data space template is present in the local DB 16, the data of the designated data space template is expanded from the local DB 16 onto the data space area 14a.

In step S25, when the designated data space template is not present in the local DB 16, the remaining sites 10-2 and 10-3 are inquired about the designated data space (at this time, the remaining sites are notified of the name of the data space input by the user). When the designated data space template is present in any one of the remaining sites, the data of the data space template is transferred from another site to the data space area 14a of the self site and expanded. Data (e.g., the address of another site or broadcast address) necessary for accessing another site is managed by the communication control section 11.

When the presence of the designated data space to be expanded in the data space area 14a is confirmed in steps S24 and S25, the data space ID translation section 13 adds IDs unique to the self site, e.g., a data space template ID to the data space template before the data of the data space is expanded in the data space area 14a in step S25B. After this, the data associated with the data space template is expanded in the data space area 14a.

When the designated data space template is not present in the remaining sites either in step S25, the data space management section 14 notifies the total control section 23. In response to this, the total control section 23 displays, on the display 24a, a message for notifying the user of the failure of data space template retrieval in step S35.

In step S26, the data space retrieval section 18 calls the access control section 21 to collate an access key given in advance to the user who is accessing the data space, which is stored in the user data memory 17, with an access key given to the data space, thereby determining whether the user has an access right to the data space or, even if the user has the access right, whether the user access range is limited. If it is determined that the user can access the data space, the total control section 23 is notified of the data space ID and completion of data read operation of the designated data space.

In step S27, the total control section 23 calls the data space display section 24 to display the data space template on the window. The data space display form is described in the data definition object, so display is performed in accordance with the description.

In step S28, by using the mouse 25b, the user places the window where the data space template is displayed on the existing window where the data space is displayed, thereby instructing to overwrite the data space template on the data space.

In step S29, in response to this, the data space event control section 25 notifies the total control section 23 of generation of an event of overwriting the data space.

In step S30, the total control section 23 calls the data space operation section 19 and also calls the data space management section 14 to retrieve the data space area 14a.

In step S31, the data space management section 14 searches the data space management section 14 to acquire the data definition object on the overwriting side (i.e., the data space template) and the data definition object on the overwritten side (i.e., the data space).

In step S32, the data space operation section 19 calls the data space synthesis section 22 to execute the data space overwrite. At this time, data class identifiers on the overwriting and overwritten spaces are acquired and collated with each other. The access control section 21 checks whether each data space has an overwritable data structure and presentation form. If the overwrite is impossible, the overwrite is not executed, and the user is notified of the failure in step S35.

In step S33, if the overwrite is possible, a new data space obtained by the overwrite is generated in the data space area 14a.

In step S34, the total control section 23 calls the data space display section 24 to display the overwritten data space on the display 24a as a window by using the data space ID obtained by the overwrite as a key.

When the inquiry about the designated data space template is to be made for the remaining sites in step S25, a message therefor may be broadcasted to the remaining sites, or the remaining sites may be accessed using logical addresses for communication such as URLs given to data on the WWW (World-Wide Web). Alternatively, the remaining sites may be accessed through a server such as directory server for translating conceptual names into logical addresses for communication. In the present invention, the method of accessing the remaining sites is not particularly limited.

(5) Processing for Request from Another Site

Figure 11:
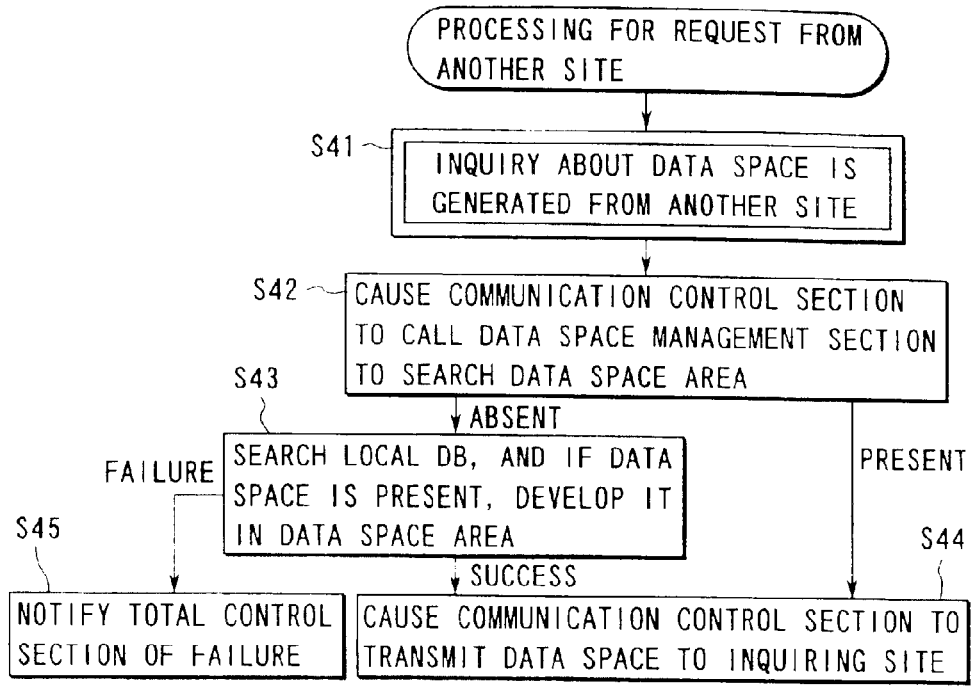
FIG. 11 is a flow chart for explaining a processing procedure for a request from another site.

A processing procedure performed when an inquiry request about a data space (including a data space template) is received from another site (step S6 in FIG. 4 and step S25 in FIG. 10) will be described with reference to the flow chart shown in FIG. 11.

In step S41, an inquiry request from another site is generated, and the communication control section 11 in the self site receives the request message.

In steps S42 and S43, the communication control section 11 calls the data space management section 14, so the data space management section 14 searches the data space area 14a. If the designated data space is not present in the data space area 14a, the local DB access section 15 is called to search the local DB 16. If the designated data space is present in the local DB 16, the data of the designated data space is expanded from the local DB 16 onto the data space area 14a.

In step S44, the communication control section 11 transmits the data of the data space expanded in the data space area 14a to another site as the inquiry source.

In step S43, when the designated data space is not present in the local DB 16, the communication control section 11 transmits a message for notifying another site of it to another site as the inquiry source in step S45.

Figure 12:
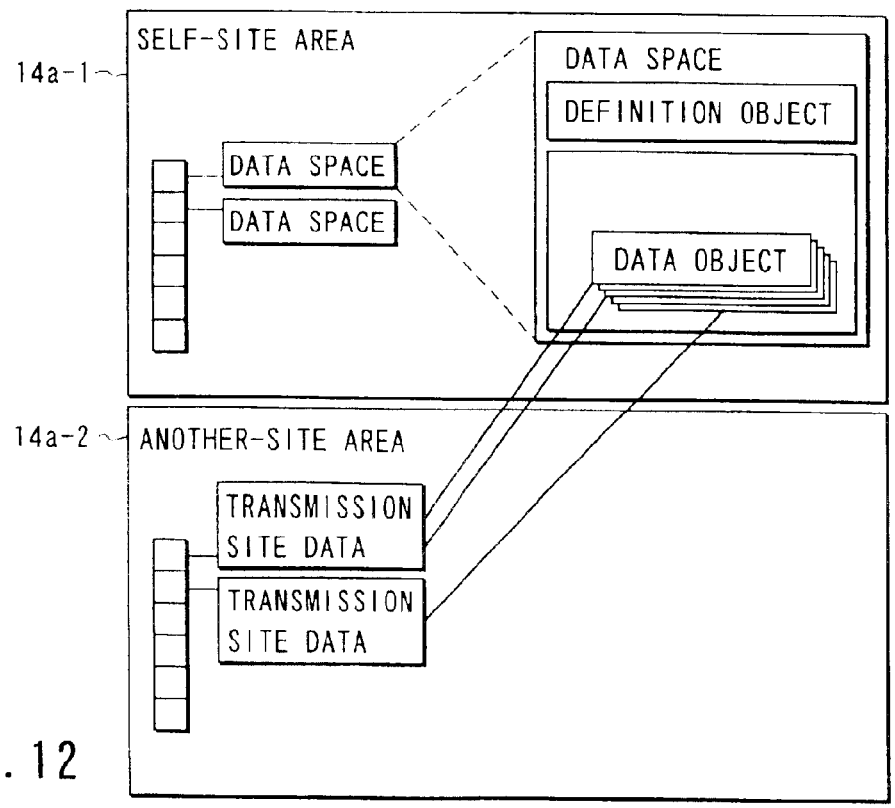
FIG. 12 is a view for explaining the data structure of a data space area on a self site when a data space present on the self site is transmitted to a source site in response to an inquiry request for the data space from the source site.

FIG. 12 shows the data structure of the data space area 14a in the first site 10-1 when the first site 10-1 transmits a data space present in the self site to another site as the inquiry source in response to a data space inquiry request from another site.

The data space area 14a comprises a self-site area 14a-1 and an another-site area 14a-2.

In the self-site area 14a-1, the data of data spaces read out from the local DB 16 in the self site and temporarily stored and managed are stored.

In the another-site area 14a-2, the transmission site data of data spaces which are present in the self-site area 14a-1 and transmitted to another site are stored while being linked to the data spaces in the self-site area 14a-1. Each transmission site data includes the identification data or address data of the transmission destination site, transmission timing (the period at which the data of a data space or updated data is transmitted), and a pointer to the data of the data space in the self-site area 14a-1.

When data associated with a data space transmission destination site, i.e., transmission site data corresponding to the data space is held, and the contents of the data space held in the self site are updated (rewritten by the user), the another-site service section 12 transmits the updated contents to another site which is referring to the data space, through the communication control section 11. Hence, the linkage and consistency of data between the sites can be maintained.

(6) Collection of Data Objects

Figure 13A:
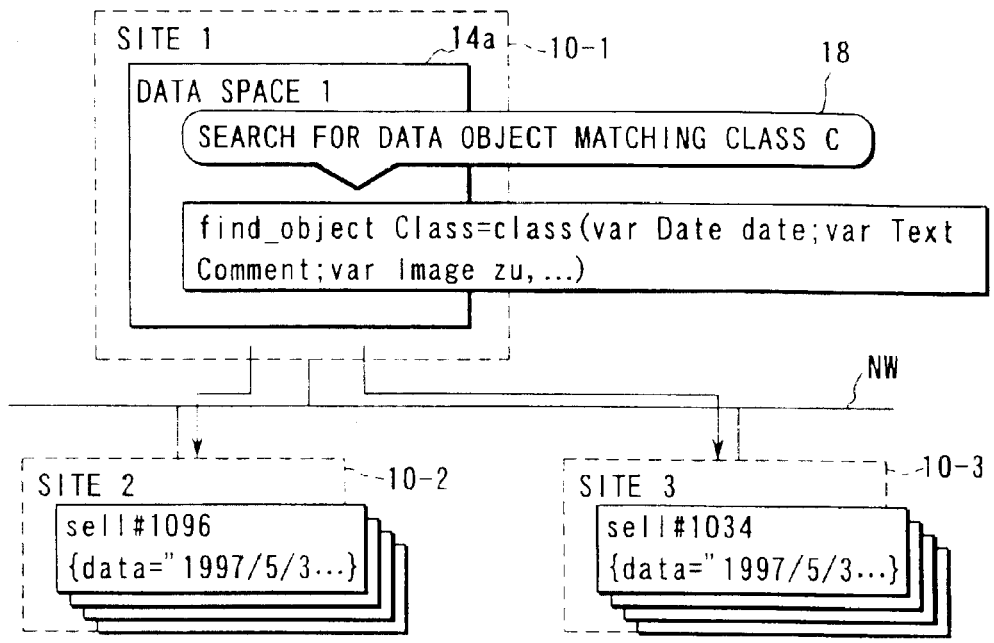
FIGS. 13A and 13B are views for explaining an operation of designating a data space template and retrieving and collecting data objects matching a data class designated by the data space template from sites, including other sites.
Figure 13B:
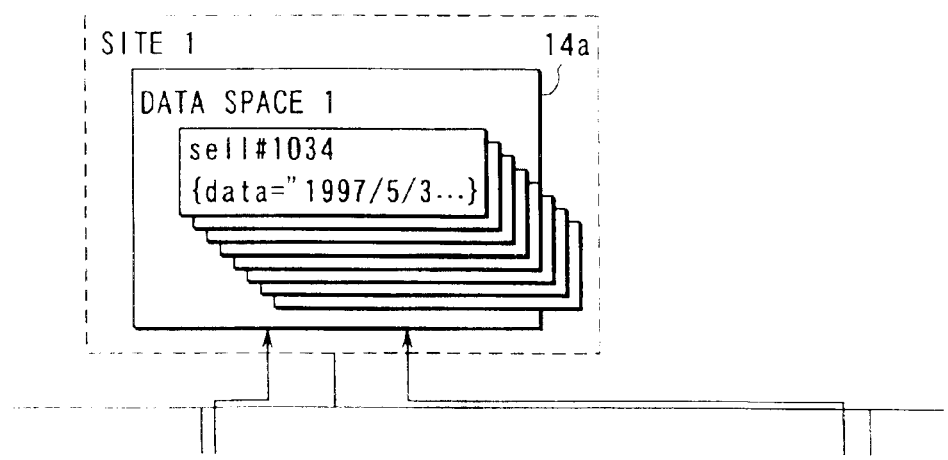

FIGS. 13A and 13B are views for explaining data object collection processing. More specifically, FIG. 13A schematically shows a case wherein a data space template is designated in the first site 10-1, and data objects matching the data class designated by the data space template are retrieved and collected from sites including the remaining sites. FIG. 13B schematically shows a case wherein the collected data objects are displayed in the first site 10-1.

As shown in FIG. 13A, first, the data space retrieval section 18 in the first site 10-1 issues a message for requesting retrieval of data objects matching a data class with an identifier "class C" to each of the remaining sites through the communication control section. In the request message transmitted, the data objects corresponding to the data class designated by "class C" have data having attributes such as "date," "comment," and "image." Data objects having such a data structure are retrieved in the self site and all the remaining sites 10-2, 10-3, . . . .

The data objects collected upon receiving this message are expanded in the data space area 14a and displayed on the display 24a as data windows.

Figure 14A:
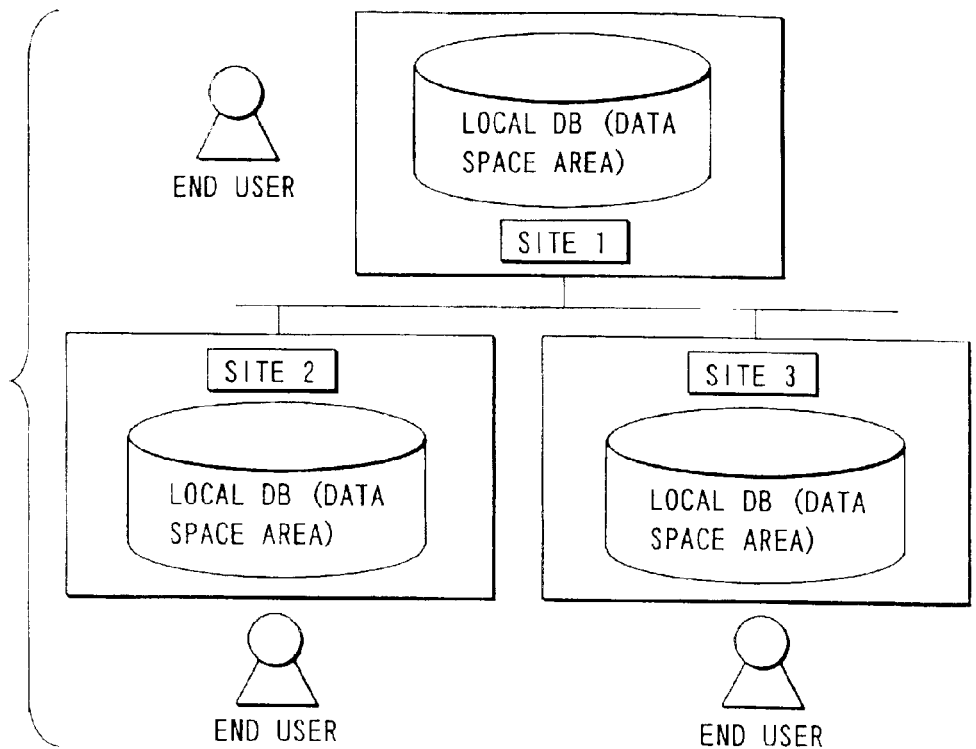
FIGS. 14A and 14B are views showing connection examples of a database system of the present invention.
Figure 14B:
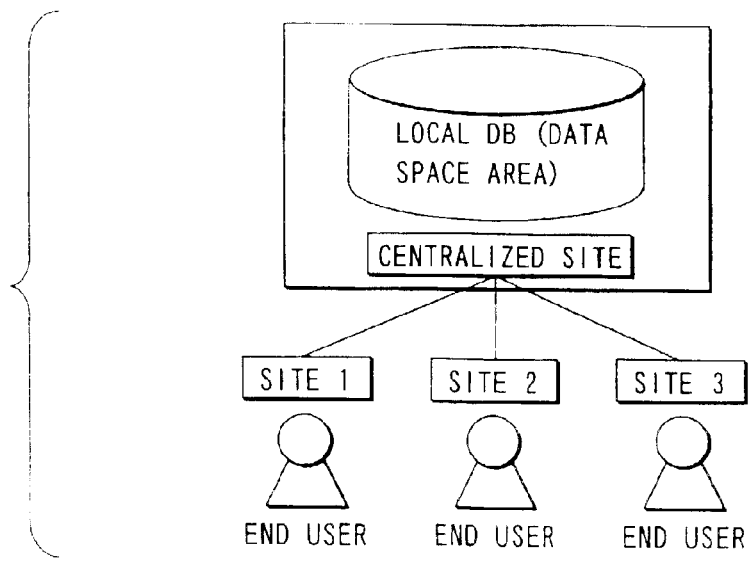

The first embodiment has been described as a distributed database system formed by connecting a plurality of database systems (sites) through a network, as shown in FIG. 14A. However, the database system is not limited to this. A centralized database system accessed by a plurality of client terminals, in which a single database system as shown in FIG. 14B is used as a database server (centralized site), may be formed. In this case, each client terminal (site, e.g., a personal computer) need not have the local DB 16 shown in FIG. 1 and only need to have some of the constituent elements shown in FIG. 1, as needed, so the embodiment can be practiced with a simple arrangement.

Effect of First Embodiment

Conventionally, a data file and a schema in which the data structure and presentation form of the data file are described are managed together. The data of the data file is displayed in accordance with the schema which is made to correspond to the data file in advance.

However, according to the first embodiment, not only a data space having data files, i.e., data objects and a schema, i.e., a data definition object but also a data space having only a data definition object which describes definition of the data structure and presentation form of an arbitrary data object is defined. The data definition objects are also stored in the database to allow retrieval by the user, like the data objects. In addition, the description of the data definition object has a structure rewritable by another data definition object. Not only by retrieving and presenting the data space but by overwriting another data space on the data space (overwriting a data definition object), desired data objects can be easily displayed by a display form desired by the user.

Since the data presentation form can be freely changed from the viewpoint on the user side, the data utilization range is widened, and data utilization can be prompted.

Another embodiments of the present invention will be described next. The same reference numerals as in the first embodiment denote the same parts in the other embodiments, and a detailed description thereof will be omitted.

Second Embodiment

In the second embodiment, flexible indices at abstract level are used to easily and efficiently perform data access at component level independently of a change in view of data or an application, thereby improving the commonality and reuse properties of data.

Along with a recent progress in data systems, data management using an object-oriented technique has received a great deal of attention.

As a background for this situation, data management becomes difficult because software properties such as applications and data increase in proportion to extension of objects to be systematized, or applications have redundant data to cope with their functional requirements.

Object orientation is an idea of software construction for constructing software mainly using more stable and static data to eliminate redundant data and allow sharing and reuse of the data, unlike the conventional idea for constructing functional-requirement-oriented software. When such an object-oriented database system is constructed, a view as a viewpoint to data is presented from an application to an external user to increase the independence from the application.

A technique of fractionizing internal data of stored data to process them as data components as needed and reusing or utilizing the data components as part of data of other files, thereby further improving the data commonality and reuse properties as the object of the object-oriented technique is described in Masayuki Arai, "OpenDoc genesis: Dawn of New Software Age," Softbank, ISBN4-89052-823-7, or David Chapel, "Understanding ActiveX and OLE (Object Linking and Embedding)," ASCII, ISBN4-7561-1706-6.

Specific operations of reusing data components in use of document data will be described while exemplifying OLE. The specific operations include all data processing operations, i.e., not only pasting a component object to another object but also embedding or linking a component object.

To paste a component object as a data component as part of another object such as a file, of necessary data having a predetermined attribute, a data component having a specific attribute value is accessed first on the basis of the object definition.

Generally, in the access to the data component, an index is used to optimize and efficiently perform the access. The number of objects (instances) having a specific attribute value is small although the access is frequently performed at high cost. For this reason, if the hit ratio of the access is low, an index as the description of a path to the data component is formed to improve the access. More specifically, an index which directly indicates a desired attribute value is defined as a limited element for a specific attribute contained in an object (instance) belonging to a certain class, thereby allowing immediate access to only an object, i.e., a data component having a specific attribute value without any wasteful access to all objects (instances) in the class.

In this manner, in accessing a data component, an external application performs data access directly using the attribute or attribute value of the object or using an index which directly indicates the specific data component.

For processing of data components obtained by access as well, the user must directly instruct paste processing in units of data components. For example, even when a plurality of data components have a predetermined relationship and require a pattern of pasting between the files, the pasting operation must be performed in units of data components.

When the contents of data are changed, a path description in an index indicating a specific data component also changes. For this reason, the index pointing the data is searched for, and related indices are redefined.

In addition, when the view of an external application is changed, corresponding objects (instances) are redefined.

As described above, the conventional data component management and processing technique such as the above-described OLE has the following problems.

As the first problem, the index for data access is a direct and temporary index added to a specific attribute at index level after all. When the contents of the instance are changed, the instance cannot be accessed unless the index is redefined, so it is difficult to cope with a change in object from the external application or user.

As the second problem, the conventional index points one attribute of an instance after all. Although there is conventionally the concept of the relation between objects, relation data between a plurality of objects is not present in the index. For this reason, data access must be performed in units of data components, and it is impossible to cope with a case in which processing operations for a plurality of data components have a pattern.

As the third problem, when an object as component data is issued, an identifier as an OID (Object ID) is added on the system side. Such an identifier can hardly be recognized and used especially by another application or user for data access and also can hardly be made to correspond to the view for an application. This makes reuse of data components difficult.

As described above, conventionally, data about an index which directly points data or a data component is independently managed. For this reason, it is hard to cope with a change in an object or the view for an application. In addition, when the data is to be accessed from an external application, the data must be directly accessed in units of necessary data components, resulting in inefficient data access. Furthermore, flexible data access is difficult to perform from another application. The second embodiment is made to solve these problems.

Figure 15:
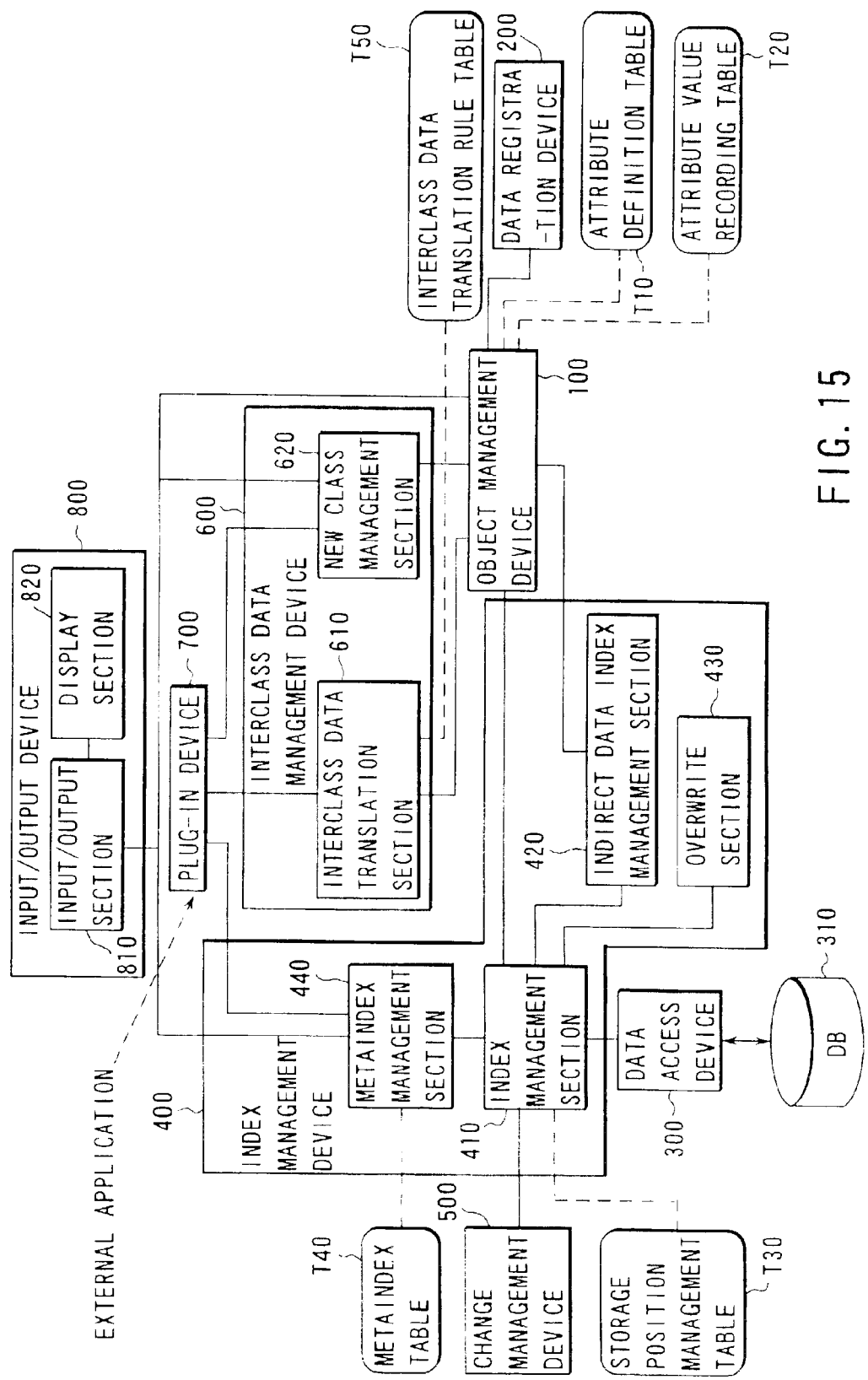
FIG. 15 is a functional block diagram showing the arrangement of a data storage and retrieval system according to the second embodiment of the present invention.

As shown in FIG. 15, a data storage and retrieval system according to this embodiment comprises an object management device 100 for defining, generating, and managing data associated with objects, a data registration device 200 for registering the data associated with objects, a data access device 300 for accessing actual data (to be referred to as real data hereinafter) stored in a database 310 or the like, an index management device 400 for defining and managing various indices corresponding to object attributes, a change management device 500 for reflecting a change in an object on related objects, an interclass data management device 600 for setting a correspondence between a newly generated class and an existing class, a plug-in device 700 for interfacing between an external application and existing objects, and an input/output device 800 for referring to or updating the contents of objects.

Figure 16:
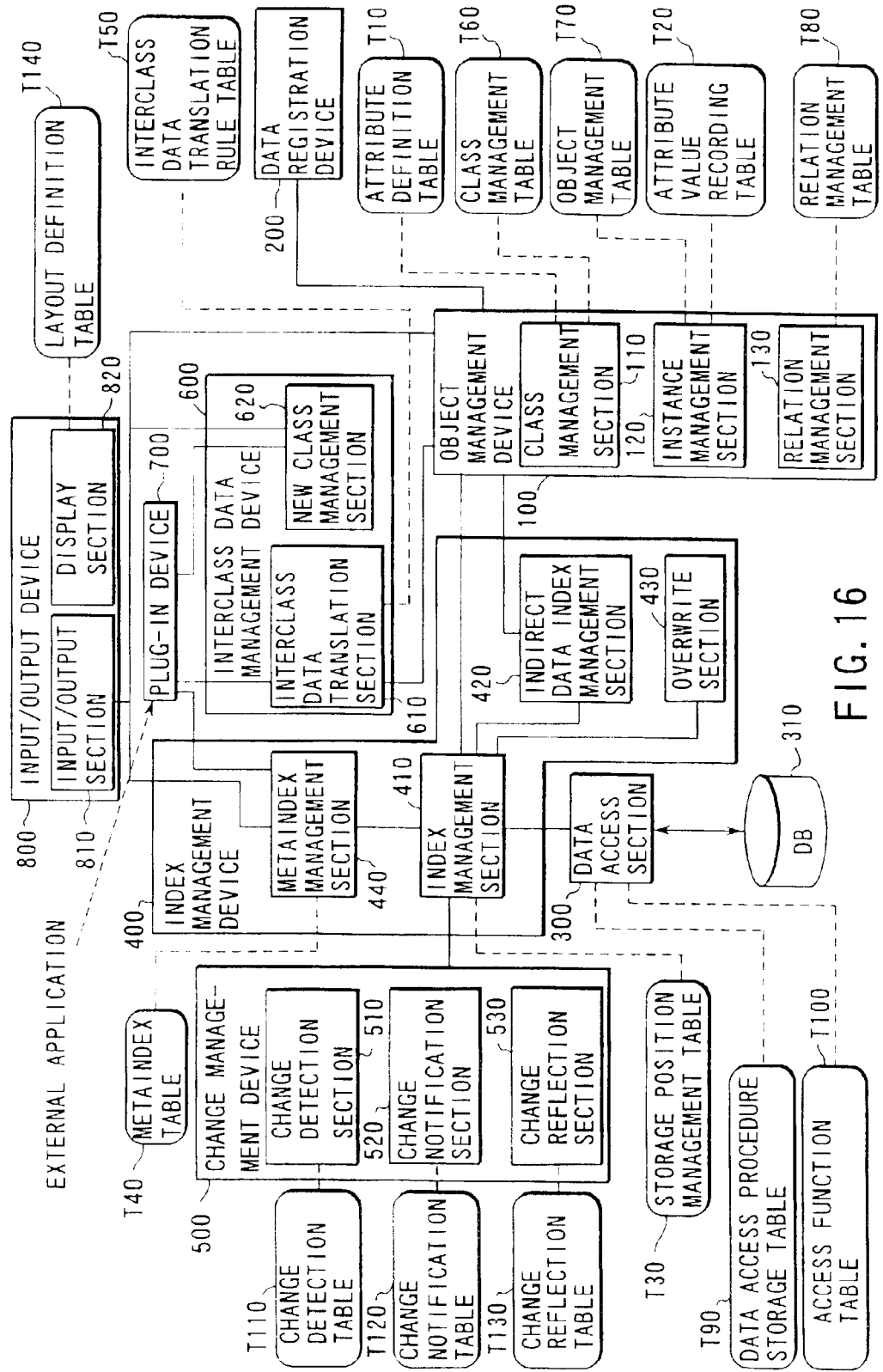
FIG. 16 is a view showing detailed of FIG. 15.

The respective units will be described next in detail with reference to FIG. 16.

The object management device 100 defines classes or relations as initialization, generates instances on the basis of these definitions, and inserts the relation between objects. The object management device 100 comprises a class management section 110 for performing definition and management associated with classes, an instance management section 120 for generating and managing objects, i.e., instances as entities, and a relation management section 130 for performing definition associated with the relations holding between a plurality of objects and management of entities.

Tables belonging to the object management device 100 will be described below. A "table" is the name of an entity used to indicate various data managed by the constituent elements or the correspondences thereof and is not limited to a so-called table load module. Any logical composition can be used. The storage position is arbitrarily determined in a memory or disk in accordance with the frequency of access or the size of the table.

An attribute definition table T10 is managed by the class management section 110. The attribute definitions of objects included in a class are recorded in the attribute definition table T10.

An attribute value recording table T20 is managed by the instance management section 120. Data associated with the attribute values of objects are recorded in the attribute value recording table T20.

A class management table T60 is managed by the class management section 110. The structure data of attributes associated with classes are recorded in the class management table T60. More specifically, the attribute names, attribute types, attribute value types, initial values, and access right as attribute data of classes are defined in units of classes. Specific defined contents will be described later.

An object management table T70 is managed by the instance management section 120. Data associated with instances as entities are defined.

A relation management table T80 is managed by the relation management section 130. Relation definition data between objects is recorded in the relation management table T80.

The relation means a relationship holding between objects. A relation R between an object A and an object B is represented by:

A–r1–(relation R)–r2–B where each of r1 and r2 represents a terminal of the relation and is called a role. In this case, r1 is the role name of the relation R viewed from the object A, and r2 is the role name of the relation R viewed from the object B. The object of the counterpart of the relation can be pointed using the role name. The relation itself has no directivity. However, in the following description, A in the above example will be referred to as a source class, B; a destination class; r1, a source role; and r2, a destination role for identification. That is, the combination of the roles, destination role, and source class is defined by relation definition.

FIG. 17 shows an example of relation definition for a relation "edit operation."

Assume that the relation "edit operation" holds between an object "Tokyo Taro" and an object "Tokyo Shinbun (newspaper)." For "Tokyo Taro" belonging to the source class, the object to be edited is "Tokyo Shinbun." For "Tokyo Shinbun" belonging to the destination class, the editor is "Tokyo Taro." The interattribute constraint in FIG. 17 is a constraint between the attributes of the objects and is inserted simultaneously when the relation is inserted between the objects.

The data registration device 200 registers data for an object generated by the object management device 100.

The data access device 300 refers to or writes data registered by the data registration device 200 for a given object attribute. A data access procedure storage table T90 is managed by the data access device 300. A procedure of acquiring the attribute value of an object is recorded in the data access procedure storage table T90.

An access function table T100 is managed by the data access device 300. Functions used to access data are recorded in the access function table T100 in units of objects to be accessed.

The index management device 400 is the principal structure of this embodiment and manages definitions of various indices as path descriptions used to access desired data and data of correspondences between designated indices and data storage positions. The index management device 400 has an index management section 410, an indirect data index management section 420, an overwrite section 430, and a metaindex management section 440.

The index management section 410 manages a correspondence among a given index, object, attribute data, and data storage position and performs processing necessary for access while referring to necessary tables in accordance with the type of data access using various indices. In the following description, [ ] represents a class name, and { } represents an instance name.

A storage position management table T30 is used for such management by the index management section 410.

Storage position data corresponding to an attribute is recorded in units of objects.

Storage position data is a character string which uniquely designates a position where data of an object is actually stored. The storage position data is described from the left using the attribute name, the related role name, and delimiters "#". One storage position cannot have a plurality of values. In such a case, the number is directly designated.

For example

"{Report}#subtext#2" means

"the second position in the subtext of the report."

An access procedure can be easily produced from such storage position data using, e.g., a method of defining an access function for storage position definition.

The indirect data index management section 420 defines an indirect data index of an object, and refers to or writes data indicated by the indirect data index. The definition of an indirect data index will be described later.

The overwrite section 430 records data representing whether the attribute of an object is writable. If the attribute is writable, the overwrite section 430 calculates the attribute value to be written.

The metaindex management section 440 manages a metaindex as index data which is secondarily given to an object index of primary level, and retrieves an object having the index from objects managed by the object management device 100, on the basis of a description using the given metaindex. A metaindex means an index of abstract level corresponding to the view for an external application. The basic index is not limited to an index of primary level. A metaindex can be secondarily given to another metaindex. An index of primary level means an index description used to access an object having the index and stored, unlike a data index or indirect data index itself which directly or indirectly points a data component.

A metaindex table T40 is managed by the metaindex management section 440. The correspondence relation between a metaindex and the index description of an index of primary level or another metaindex is recorded in the metaindex table T40.

Details of attribute data in object class definition will be described below with reference to FIG. 18. As shown in FIG. 18, attribute data for class definition includes an attribute name, attribute type, and attribute value type.

An attribute type represents a data structure as the container of an attribute value. The types are single value, list, and table, as shown in FIG. 18. In "Single value," only one attribute value is stored. In "List," a plurality of attribute values are recorded, and a unique attribute value can be referred to on the basis of one natural number. In "Table," a plurality of attribute values are recorded, and a unique attribute value can be referred to on the basis of the combination of two natural numbers. In class definition, the type of access, i.e., a read or write allowed for the attribute value of the attribute is added as an access right.

As an attribute value type, the contents of data are directly used as a value, or data outside the range directly managed by an object or reference data or definition data of an object is used as a value. The former attribute value types include a character string (STRING) or number (NUM). The latter attribute value types include a data index, object reference, data reference, and indirect data index data.

The object reference is recording position data of other objects and is used to refer to other objects for relation definition or the like. When a relationship holds between objects, "an attribute name=role name" is prepared, and the object reference of the link destination is recorded as the attribute value of the attribute. Generally, a plurality of objects have a certain relation to an object, so the attribute type of "attribute name=role name" is "List". The data reference is data representing the recording position of data managed by an object.

The concept, description method, defined contents of an index used as the attribute value of an object and used for data access in this embodiment will be described below.

Indices are used to fractionize data managed by an object into components and manage the components with identifiers.

In a data index, the recording position of data necessary for accessing actual data managed by an object and data associated with the access method are recorded as an attribute value. For a data index, the contents of the attribute value are as follows.

{data type, access type, access function, argument}

The data type represents the type of data. The access type represents whether the function means a write or read. The access function describes a function name for access. In the argument, data necessary for a write in this attribute is written.

When the data index is used, contents of arbitrary data or part, i.e., a data component thereof can be referred to or written as if they were the attribute value of the management object.

An indirect data index is index data which is defined by an expression containing another index and has, as its value, a value obtained by indirectly referring to the attribute value of another attribute in the self object or another related object and processing the attribute value. The arithmetic expression means an arithmetic expression for referring to another value using an index description relative to the self index.

Such an indirect data index is described by the combination of the index description and an operator. For example, "SUM (subtext, number of lines)" represents that the number of lines of the self subtext is summed.

An index description is a description for designating a specific attribute of an object. In this embodiment, an index description is represented as follows using the character string of the attribute name or related role name and a symbol=".".

object. (attribute name or related role name)****. attribute name

This notation means that a desired attribute is obtained through one or a plurality of attributes or related role names from the left using "." as identifiers. For example, "{report}. subtext. author. age" means "the age of the author of the subtext of an object {report}"

In the index description of an indirect data index, the self object is regarded as the default object. For this reason, the index description is a relative description excluding the object.

When a related role name is used in the index description, one or a plurality of objects are related to one related role, so one or a plurality of attributes are indicated by one index description.

For example, when {report} has a plurality of subtexts, attribute="{report}. subtext. author. age" indicates a set of ages of a plurality of authors.

This embodiment incorporates a description method of indicating a specific attribute in a plurality of values corresponding to one index description. More specifically, the following three description methods are used.

As the first description method, an attribute is designated using a number.

"{Report}." subtext#2. author. age" specifically indicates the object of the second [text] of "{report}. subtext"

As the second description method, an attribute is designated using the value of the attribute.

"{Report}." subtext. {name=section 3}. author. age" specifies a related document named "section 3."

As the third method, an attribute is designated using a key attribute.

In attribute definition, when a key attribute is designated (in this case, a name), the key attribute value can be used to make the following designation.

"{Report}." subtext. Section 3. author. age"

The links of these index data are recorded in the storage position management table T30 and used to interpret the index.

The access right in class definition represents data associated with access permission in management or data associated with actual write or read possibility. The holder may change in units of attributes. In addition, access data including data associated with the holder of the attribute value may be defined.

FIG. 19 shows the contents of the class management table T60 in this embodiment.

"Universe" is the parent class of all objects and has "name" and "data" as reference to the managed table as attributes. All classes are subclasses of "universe" and inherit "name" and "data" as attributes of "universe." In FIG. 19, attribute definitions to be inherited are omitted for the illustrative convenience.

"Text" class is a subclass of "universe" class. Attribute "title" has an indirect data index attribute definition and a value representing reference to attribute "name." Attribute "author" is a related role name, and its value represents another related object reference.

"Section item" class is the subclass of "text" class. Attribute "contents" has a data index attribute definition and an attribute value "{doc, read, GetContens, null}, {doc, write, PutContens, value}"

For a read, a function

"type=doc, access function=GetContens, argument=null" is designated.

For a write, a function "type=doc, access function= PutContens, argument=value" is designated.

Attributes "number of lines" and "abstract" are also defined as indices for data.

Attribute "author name" has an indirect data index definition and refers to attribute "name" of an object referred to from attribute "author." Attribute "main text" is a related role name.

For [management operation] class, attribute type "table" is used.

More specifically, for attribute "progress," the attribute value type is "indirect data index," and the attribute type is "table."

+progress table, IdIndex, "related text. <{name=key, number of lines}>"

This indirect data index value means that table rows are expanded for a plurality of objects indicated by attribute "related text," and columns are expanded for each row in the order of attributes <name, number of lines>, thereby constructing a table.

In this embodiment, when an index is conveniently described using a number in the list of related texts, and three related texts correspond to the value of attribute "progress," a table shown in FIG. 20 is expanded. Note that "key" in the attribute value represents that "name" is a key attribute for discrimination between the related texts.

FIG. 21 shows the contents of the relation management table T80 defined by the relation management section 130 in correspondence with class definition in FIG. 19.

When real data changes, the change management device 500 updates the attribute values of corresponding objects and simultaneously other attributes which are indirectly referred to by indirect data indices, thereby performing management associated with a change. The change management device 500 has a change detection section 510 for monitoring a change in data, a change notification section 520 for calculating a change value for a related attribute when data changes, and notifying of it, and a change reflection section 530 for updating the attribute values of related objects.

A change detection table T110 is managed by the change detection section 510. Objects, indices to be monitored, and change notification means module name are recorded in the change detection table T110 (FIG. 22A).

A change notification table T120 is managed by the change notification section 520. A change notification source, change reflection module name, and calculation reference data and computational expressions necessary for reflection of a change in data are recorded in the change notification table T120 (FIG. 22B).

A change reflection table T130 is managed by the change reflection section 530. Objects and indices on which a change is reflected, and change notification means module name are recorded in the change reflection table T130 (FIG. 22C).

The interclass data management device 600 manages definition data of a new class corresponding to a new view used by an external application, and a translation rule used for translation between the new class definition and existing class definition. The interclass data management device 600 has a new class management section 620 for defining a new class and managing the definition data, and an interclass data translation section 610 for managing a translation rule between new class definition and existing class definition, monitoring the object management device 100 on the basis of the rule, and sequentially generating the virtual instances of the new class corresponding to the instances of existing classes.

An interclass data translation rule table T50 is managed by the interclass data translation section 610. Definition data of a translation rule between classes is recorded in the interclass data translation rule table T50.

The plug-in device 700 is an interface portion to all external applications. When an external application which uses real data stored in the data storage and retrieval system of this embodiment is to access the system using a new view, i.e., even when the terms of data assumed by the application do not match the terms of attributes managed by the object management device 100, or a class system or data structure assumed by the external application is different from the class system or attribute structure managed by the object management device 100, the real data can be used. More specifically, when terms are different, the difference between the terms is registered in the metaindex management section 440 as a metaindex. When the class systems or attribute structures are different, the class system assumed by the application is defined in the new class management section 620, and simultaneously, the translation rule between the new class and the existing class is registered in the interclass data translation section 610, thereby maintaining matching in installation of the application.

The input/output device 800 displays various data of objects in the data storage and retrieval system of this embodiment in response to a request.

The input/output device 800 has an input/output section 810 for referring to or writing the contents of an object, and a display section 820 for displaying the actual contents of an object in accordance with a defined layout. A layout definition table T140 is managed by the display section 820. Definition data for display layout is recorded in the layout definition table T140.

Object management can also be realized by a database represented by an object database for handling objects, or by imparting functions necessary for the conventional relation database. In this embodiment, real data means entities as resources on the computer, represented by files or table data stored in the database, and can be easily referred to from software on the basis of certain instruction data (e.g., a unique name). An arbitrary composition can be used, so either structurized data or unstructurized flat data may be used. The database storing the real data may be either a relation database or file storage. The position of the database storing objects or data can be concentrically managed by a single computer or a plurality of computers connected through a network. More specifically, objects corresponding to specific data on a computer for personal use by each individual in an office may be generated and exchanged between users through a network. In this case, distributed object management is done using the conventional distributed object technology.

The hardware arrangement of this embodiment can be realized not only by a conventional computer system comprising a CPU for performing various processing operations, an input device such as a keyboard, mouse, or various readers, an external storage device such as a memory device or disk device, and an output device such as a display device or printer but also by dedicated hardware suitable for object processing. The CPU has an arithmetic section for performing various processing operations, and a main storage section for storing instructions and data for processing.

This embodiment has the above-described arrangement. Contents of processing of accessing and reusing each data component of stored data using the data storage and retrieval method of this embodiment will be described below.

More specifically, (1) contents of initial registration for accessing data components, (2) data access using an indirect data index, (3) data access using a metaindex, (4) reflection on related objects when real data is changed, (5) data access from a new application when an external application is added or changed, and (6) display of contents of managed objects will be sequentially described below.

(1) Contents of Initial Registration for Accessing Data Components

As initial registration, an object environment for accessing data components is set. More specifically, objects are initialized by the object management device 100.

The object management device 100 creates objects with reference to an object initialization file in which a sequence of functions for initialization is recorded. Functions for initialization are prepared in the object management device 100 in advance. FIG. 23 shows an example of the object initialization file. In this embodiment, two functions object creation function: objectCreate (class name and instance name)

object relation insertion function: relationAssert (object name 1, object name 2, and related role name) are used. These functions are loaded from the upper side to the lower side of the initialization file to sequentially execute object creation and relation setting between objects.

In a created instance, an instance name as attribute "name" is recorded.

For each created object, a necessary data index and indirect data index are defined in accordance with the respective attribute value types, as described above.

In creating instances, the attribute definition table T10 is generated, and attribute data is copied from class definition, so the attribute definition of each instance is recorded and stored.

Data of the created objects are registered by the data registration device 200. In this embodiment, text files are registered using a registration function dataRegistor (index and data object)

Registration processing may be performed as batch processing by describing the function in the initialization file. Alternatively, the user may instruct registration at an arbitrary timing through the input/output section 810. FIG. 24 shows an example of data registration contents.

With this data registration, the attribute values of the objects are recorded in the attribute value recording table T20. FIG. 25 shows an example of contents of the attribute value recording table T20. Inherited attributes are also recorded in the attribute value recording table T20. As the attribute values of indirect data indices, values in which reference values are embedded are recorded. To refer to the attribute value of such an indirect data index, real data may be accessed using the data access device 300 on the basis of definition data associated with the index or attribute. In an arrangement in which the change management device 500 synchronously updates the contents of the attribute value recording table T20, the user can access the attribute values at a high speed only by referring to the contents of the attribute value recording table T20.

In data registration, storage positions corresponding to the respective objects are registered in the storage position management table T30 in units of attributes of objects.

In addition, a data access portion necessary for data access is registered in the data access procedure storage table T90, and the access function is registered in the access function table T100.

(2) Data Access Using Indirect Data Index

Figure 26:
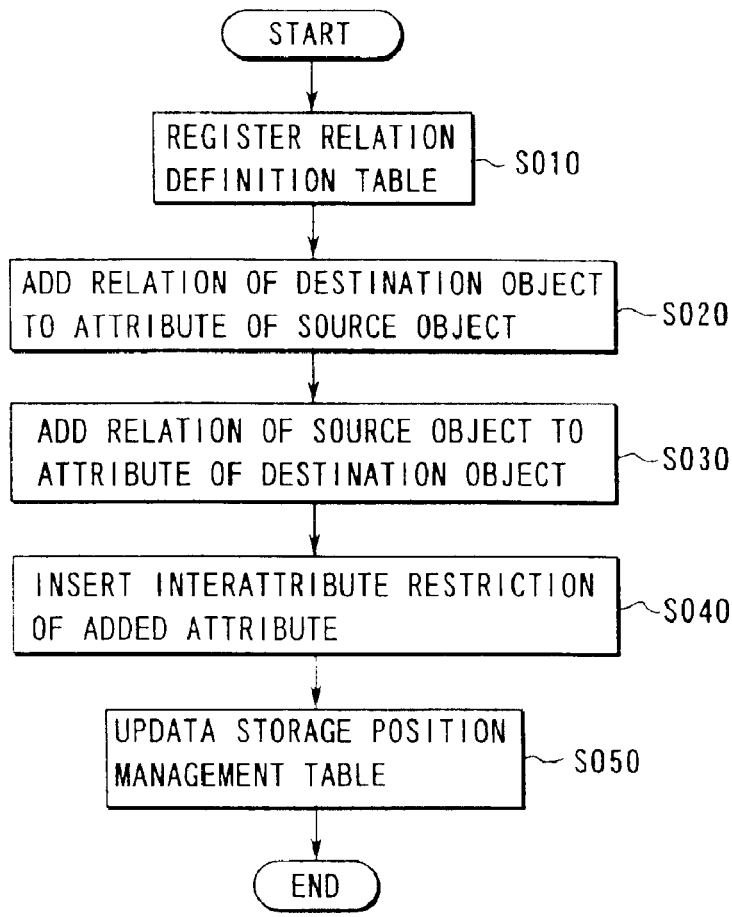
FIG. 26 is a flow chart showing a procedure of inserting a relation in the embodiment of the present invention.

A relation necessary for indirectly referring to the attribute from another object is inserted. FIG. 26 shows a processing procedure of inserting a relation between objects in this embodiment. The processing will be described below in accordance with this algorithm. A function used to insert a relation is relationAssert ({report}, {section 1}, main document)

A relation shown in FIG. 27A is registered in the relation management table T80 (S010). Subsequently, the reference of a destination object shown in FIG. 27B is added to attribute "subsequent role name" of the source object (S020).

The reference of a source object shown in FIG. 27C is added to attribute "preceding role name" of the end object (S030).

Subsequently, interattribute constraint="{section item}. report name <={report}. name" is inserted.

In this case, the restriction represents that attribute "report name" of the section item refers to attribute "name" of report (S040).

Finally, storage position data is updated such that objects associated with relation setting can be acquired (S050).

Figures 28, 29:
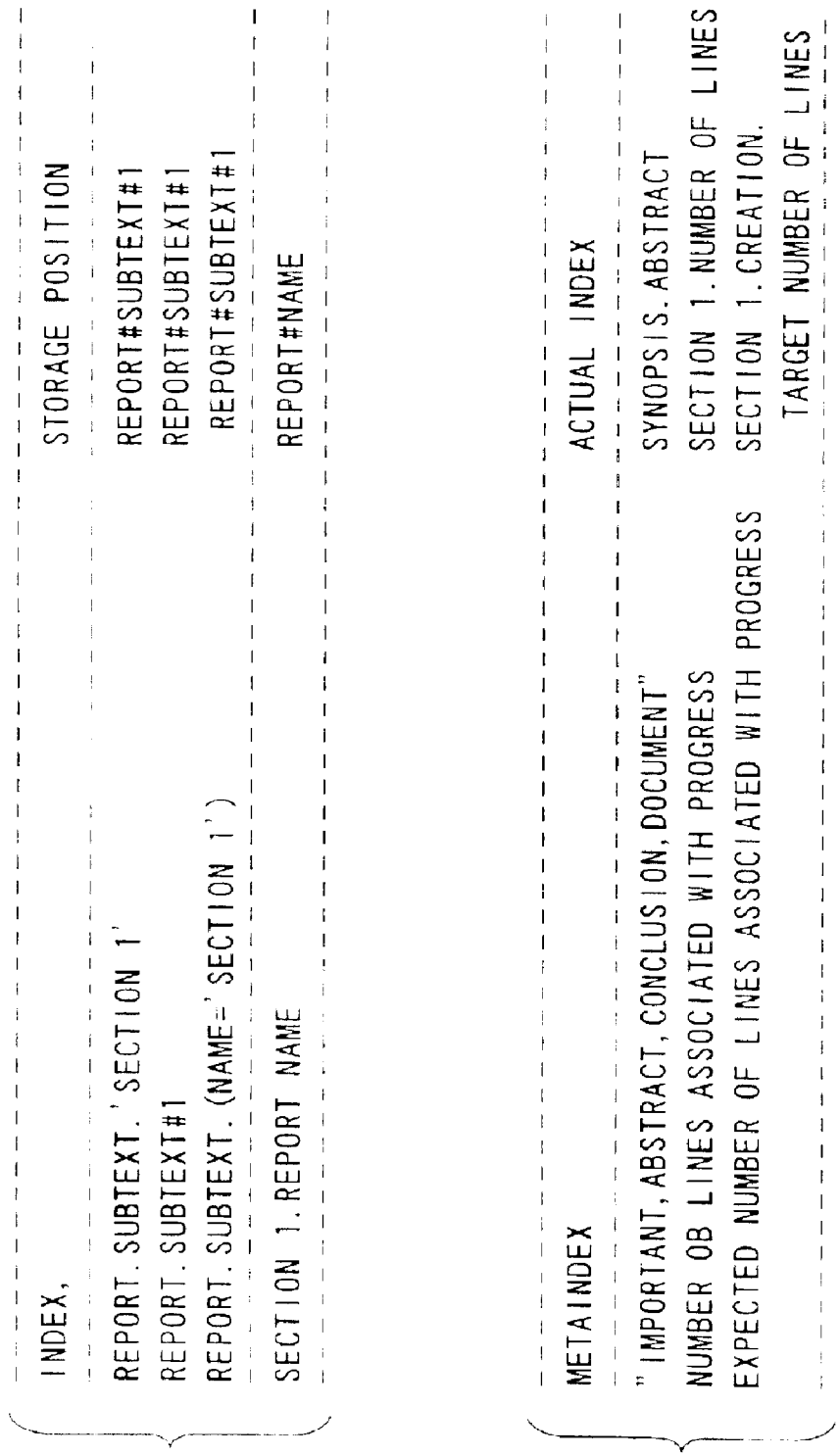
FIG. 28 is a view showing the contents of a storage position management table.
FIG. 29 is a view showing the contents of a metaindex table.

FIG. 28 shows part of updated {report} in the storage position management table T30. Entries of the storage position management table T30 about related {section 1} are also updated.

A new view for the application is added, or metaindices which can be arbitrarily set in correspondence with a change are registered. This registration is performed by adding metaindices and entries of the correspondence relationship of indices as the base of the metaindices to the metaindex table T40. For example, a metaindex "important, abstract, conclusion, document" can be added to attribute "synopsis. abstract." FIG. 29 shows part of the metaindex table T40 including the registered contents.

On the basis of the given metaindex description, the metaindex management section 440 retrieves a corresponding index of primary level from the metaindex table T40. Assume that metaindex "text and conclusion" is given. By function processing searchIndex ("text and conclusion") a value "synopsis. abstract" is obtained.

The constant of a metaindex is very flexible. Depending on the definition manner, a plurality of indices can be collected and synthesized for the purpose.

For example, on the basis of metaindex description "number of lines associated with progress/expected number of lines associated with progress," a corresponding index of primary level is retrieved.

Index "section 1, number of lines" is obtained in correspondence with "number of lines associated with progress."

Index "section 1, creation, target number of lines" is obtained in correspondence with "expected number of lines associated with progress." When these indices are combined and calculation is performed, the following result can be obtained:

searchIndex ("number of lines associated with progress/ expected number of lines associated with progress")=section 1. number of lines/section 1. creation. target number of lines An example of processing when an indirect data index is added after initialization/registration processing will be described below.

Figures 30A, 30B, 31:
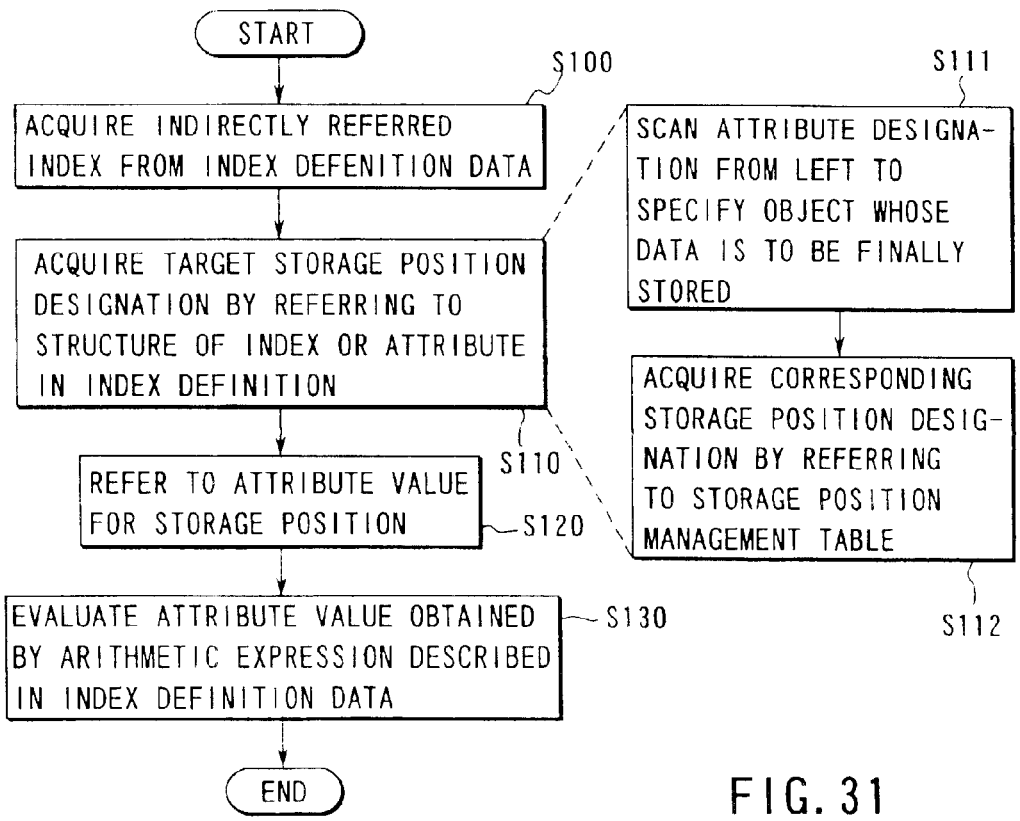
FIGS. 30A and 30B are views showing entries of an attribute definition table added by indirect data index addition.
FIG. 31 is a flow chart showing a processing procedure of accessing an attribute value using an indirect data index.

When new attribute "person in charge" is added to object "report," an entry shown in FIG. 30A is added to rewrite the contents of the attribute definition table T10 corresponding to object "report," and simultaneously, the attribute structure of already created objects is also changed.

The attribute value type of attribute "person in charge" in {report} is an indirect data index, and {author} represents another attribute.

When attribute "total number of lines" which also has, as the attribute value, an indirect data index is added to object {report}, an entry shown in FIG. 30B is added to rewrite the contents of the attribute definition table T10.

A plurality of objects [text] are subtexts of {report}, so indices "subtext and number of lines" are listed. SUM is the summation operator of the list. This means that attributes "number of lines" of all objects referred to by attribute "subtext" are referred to and summed to obtain the value of attribute "total number of lines."

(3) Data Access Using Metaindex

Contents of processing of accessing data or a data component using this embodiment will be described below.

Data access using an indirect data index will be described first.

FIG. 31 shows the flow of access using an indirect data index. In the following processing, when a plurality of objects are obtained, the storage positions are stored as a list, and when a case in which a plurality of objects correspond to one index are generated a plurality of number of times, a list having a nest structure is stored.

As the first example, access using the indirect data index for attribute="person in charge" in {report} will be described. In the above-described indirect data index addition, the attribute value type of attribute "person in charge" is an indirect data index, as shown in FIG. 30A and it is defined that this attribute refers to another attribute "author" in the same object. The indirect data index management section 420 obtains "report. author" as an index to be referred to from indirect data index definition "person in charge is {author}" in step S100.

In step S110, designation of a target storage position is acquired with reference to the index or attribute structure in the index definition. This processing will be described in more detail. First, the index description is sequentially scanned from the left, and finally, an object whose data is to be stored is specified (S111). Next, designation of a corresponding storage position is acquired with reference to the storage position management table T30 (S112). With this processing, the storage position is accessed to obtain a corresponding attribute value.

Subsequently, the index management section 410 is referred to, thereby obtaining {Mr. D} as "report. author" (S120).

Finally, "Mr. D" is embedded in the attribute value, and consequently, "person in charge is Mr. D" is obtained (S130).

As the second example, a case in which attribute "total number of lines" having the attribute value of an indirect data index corresponding to object={report} is referred to will be described.

+Total number of lines, single value, IdIndex, "SUM ({subtext. number of lines})"

In this case, a plurality of objects [text] are subtexts of {report}. Therefore, subtexts and the numbers of lines are listed. SUM is the summation operator of the list. More specifically, the above computational expression means that attributes="number of lines" of all objects referred to from attribute="subtext" are referred to and summed to obtain the value of attribute="total number of lines."

When {report. total number of lines} is referred to, all subtexts and numbers of lines are referred to (S120), and the sum thereof is obtained as a value (S130). Assume that
    section 1. number of lines=10,
    section 2. number of lines=30, and
    synopsis. number of lines=20
    "report. total number of lines" is 60.

The access method associated with an indirect data index is not limited to the method using the above-described procedure. As another method, for example, a change value is reflected on an attribute represented by an index by the change notification section 520 every time the data is changed, and the same procedure as in access using a normal attribute value except an indirect data index is used to obtain a value.

A data write procedure when the access right in an indirect data index is "writable" will be described below.

In the indirect data index definition, the access right of the defined indirect data index is calculated on the basis of the access right of an index to be referred to and the nature of calculation.

Even in access using the indirect data index, if the access right is "writable," the data can be written. This write operation is performed in the following manner. First, the overwrite section 430 determines whether an attribute can be written, on the basis of whether the inverse function of the computational expression of attribute definition is present. If the inverse function is present, it is determined that an attribute can be written, and the value to be written is calculated. The data access device 300 writes the value in the actual database in accordance with storage position designation obtained in step S110 in FIG. 31. The overwrite processing can also be performed by adding an overwrite module into the change management device 500 (to be described later).

An example of data access when an indirect data index indicates a plurality of objects, i.e., the attribute type of the paste destination is "table" will be described below.

{Report creation management} is an instance of class [management operation], and attribute "progress" is defined as shown in FIG. 32.

The values of {report creation management}. related text represent lists. Each list element is set on a row, and the attribute values of attribute "name" and attribute "number of lines" of each list element are set on columns.

At this time, contents shown in FIG. 33 are recorded in the attribute value recording table T20.

For {report creation management} object, correspondences between indices and storage positions based on the key attribute are recorded in the storage position management table T30 on the basis of the key attribute of the table, as shown in FIG. 34.

In this case as well, to realize access using a specific indirect data index, a value is obtained through relation data in access or by change management by the change management device 500 when the data is changed.

Processing contents when the user accesses the attribute value of an object or real data using the input/output device 800 will be described next.

Two Functions
    getValue (index description), and
    putValue (index description, value)
are used as access functions to an object in the input/output device 800.

FIGS. 35 to 38 are flow charts of processing of accessing the attribute value of an object from the input/output device 800. Access processing shown in FIGS. 35 to 38 is performed not only in response to a request from the input/output device 800 but also in response to a request from an external application through the plug-in device 700.

A case in which a write of the attribute value of an object is requested will be described first with reference to FIGS. 35 and 36.

Figure 35:
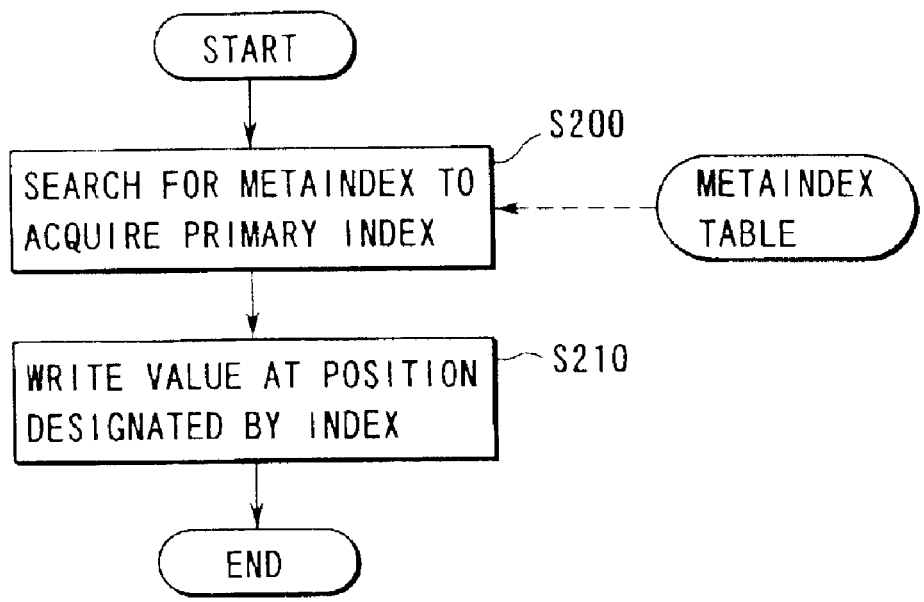
FIG. 35 is a flow chart showing a data write processing procedure using a metaindex description by a metaindex management means.

When a Write Function
    putValue (index description, value)
is called from the input/output device 800, control is transferred to the metaindex management section 440 to perform processing shown in FIG. 35. The metaindex management section 440 determines first whether the given/index description is a metaindex. More specifically, the metaindex management section 440 searches the metaindex table T40 for a table entry corresponding to the input index description. If the table entry is present, an index of primary level which is to be actually accessed is obtained (S200). If the given metaindex is a metaindex added to another metaindex, a table entry is recurrently searched for to obtain an index of primary level. Subsequently, from the index, a value corresponding to the index is obtained using the index management section 410 (S210).

Figure 36:
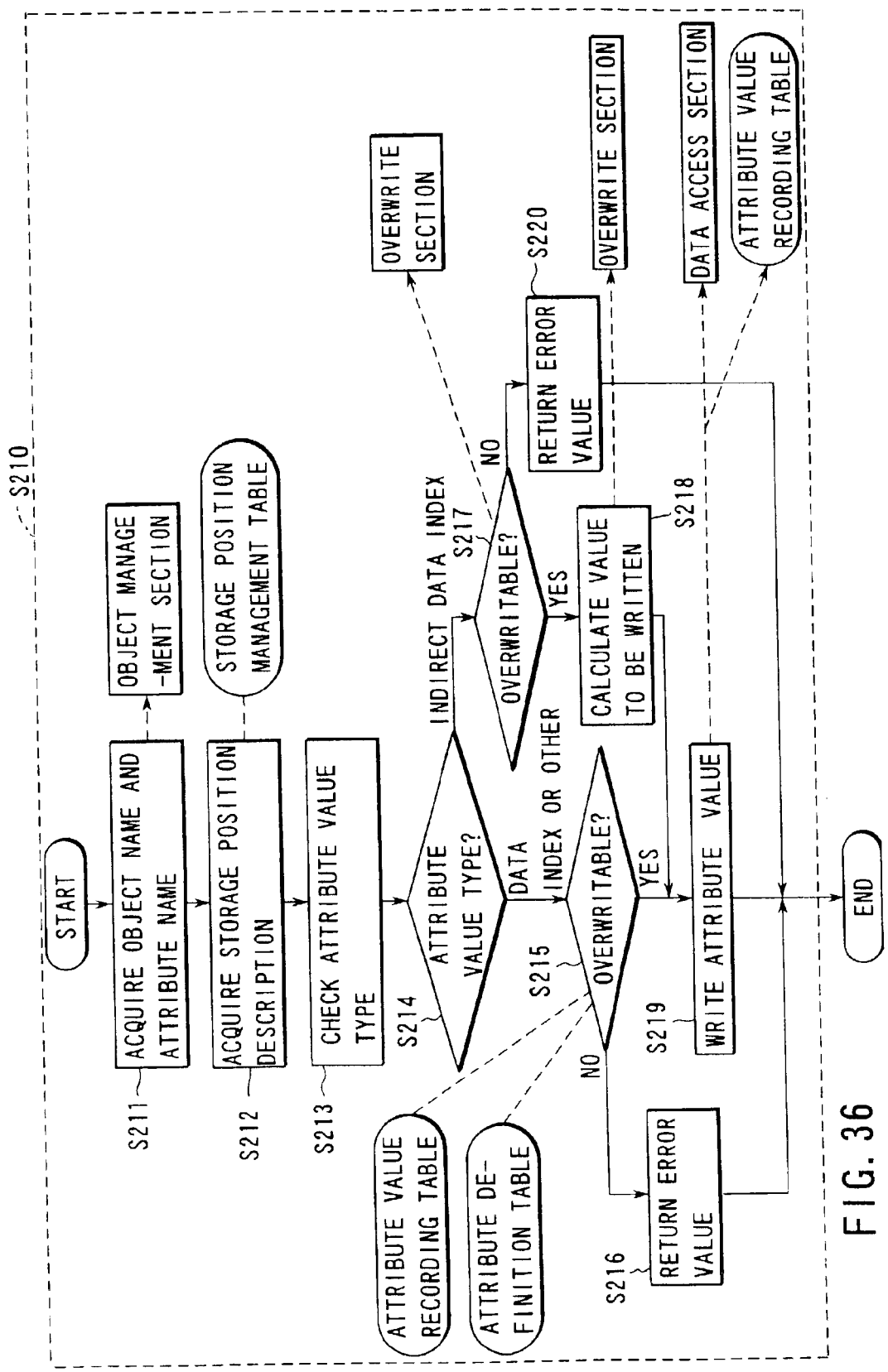
FIG. 36 is a flow chart showing a data write processing procedure using the metaindex description in an index management means.

FIG. 36 is a flow chart showing attribute value acquisition (step S210) by the index management section 410 in more detail.

When control is transferred to the index management section 410, an object name and attribute name in which the attribute represented by the index is directly recorded are acquired on the basis of the relation definition with reference to the attribute definition table T10 of the object management device 100 and also the relation management table T80, as needed (S211). From the obtained object name and attribute name, the storage position description of the attribute is acquired with reference to the storage position management table T30 (S212).

The index management section 410 further determines the attribute value type and performs corresponding processing. More specifically, the attribute definition table T10 of the object management device 100 is referred to and it is determined whether the attribute value type of the given index: "data index," "indirect data index," or "any other index" (S214).

When the attribute value type is "data index" and overwritable (S215), the attribute value is written from the storage position description through the data access device 300 (S219). If the index cannot be overwritten, an error value is returned, and processing is ended (S216). When the attribute value is written on real data on the database and in the attribute value recording table T20 simultaneously, the data consistency for access from other devices is maintained.

When the attribute value type is "indirect data index," the index management section 410 transfers control to the overwrite section 430. If it is determined that the attribute can be overwritten, on the basis of the computational expression of indirect data index on the attribute definition table T10 (S217), the overwrite section 430 calculates the value to be written using the computational expression (S218). If the attribute cannot be overwritten, an error value is returned, and processing is ended (S220). Upon receiving the returned value to be written, the index management section 410 writes the attribute value from the storage position description, as described above for a data index (S219).

When the attribute value type is neither "data index" nor "indirect data index," the index management section 410 determines whether the attribute can be overwritten, with reference to a flag representing whether the corresponding entry in the attribute value recording table T20 can be overwritten (S215). If the overwrite is allowed, the attribute value is written, as described above (S219). If the overwrite is not allowed, an error value is returned, and processing is ended (S216).

The above-described flow of processing will be described using specific values. Assume that
putValue ({section 1. comment, "this section requires considerable correction") is given from the input/output device 800. Since a metaindex corresponding to "{section 1. comment}" is not present (S200), the metaindex management section 440 accesses the value using "{section 1. comment}" as an index of primary level. The index management section 410 obtains, through the object management device 100, object {section 1} at which attribute "comment" is recorded (S211), and obtains storage position description "section 1#comment" with reference to the storage position management table T30 (S212). The index management section 410 also obtains that the attribute type of "section 1. comment" is "single value," and the attribute value type is "STRING" by referring to the attribute definition table T10 (S214).

Figures 39, 40, 41:
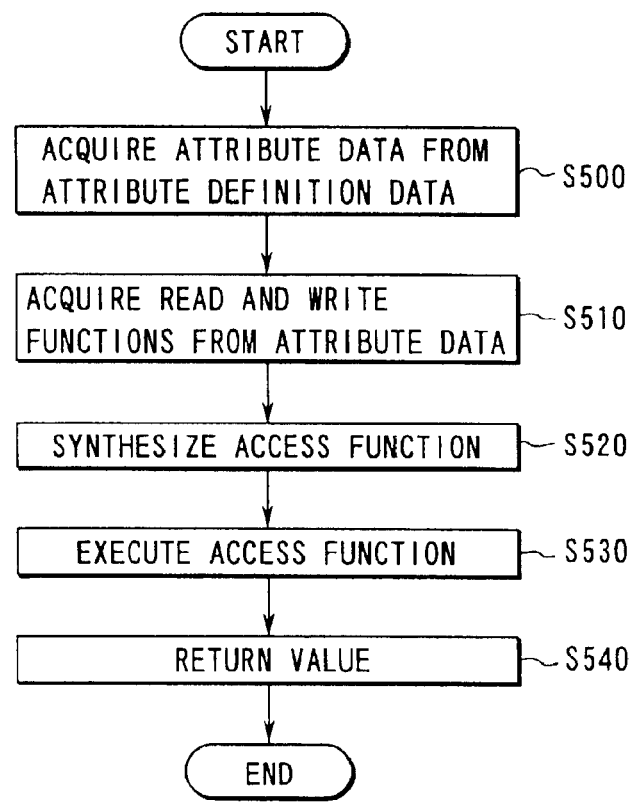
FIG. 39 is a view showing part of contents of the attribute value recording table.
FIG. 40 is a flow chart showing a data access processing procedure using a data index.
FIG. 41 is a view showing the contents of an access function table.

In this case, if the attribute value type is neither "indirect data index" nor "data index," and the attribute can be overwritten, attribute value "this section requires considerable correction" is written on the real data on the database through the attribute value recording table T20 and data access device 300 (S219). FIG. 39 shows part of contents of the attribute value recording table T20 after the write.

Figure 37:
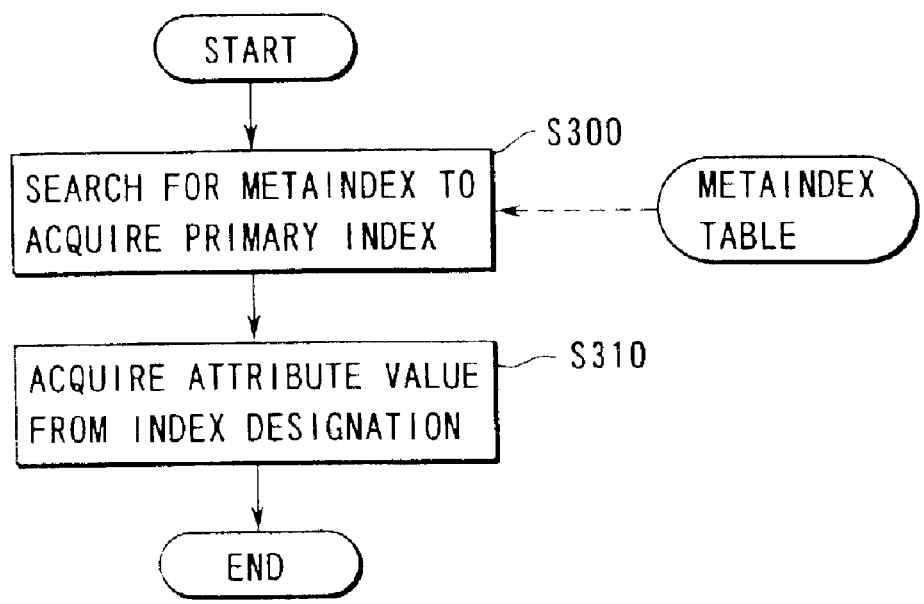
FIG. 37 is a flow chart showing a data read processing procedure using the metaindex description in the index management means.

A case wherein the read of the attribute value of an object is requested will be described next with reference to FIGS. 37 and 38 only for portions different from write processing.

When a Read Function
getValue (index description)
is called from the input/output device 800, control is transferred to the metaindex management section 440, as in the write operation. Metaindex search processing shown in FIG. 37 is performed to obtain an index of primary level which is to be actually accessed (S300).

From the obtained index, a value corresponding to the index is obtained using the index management section 410 (S310).

Figure 38:
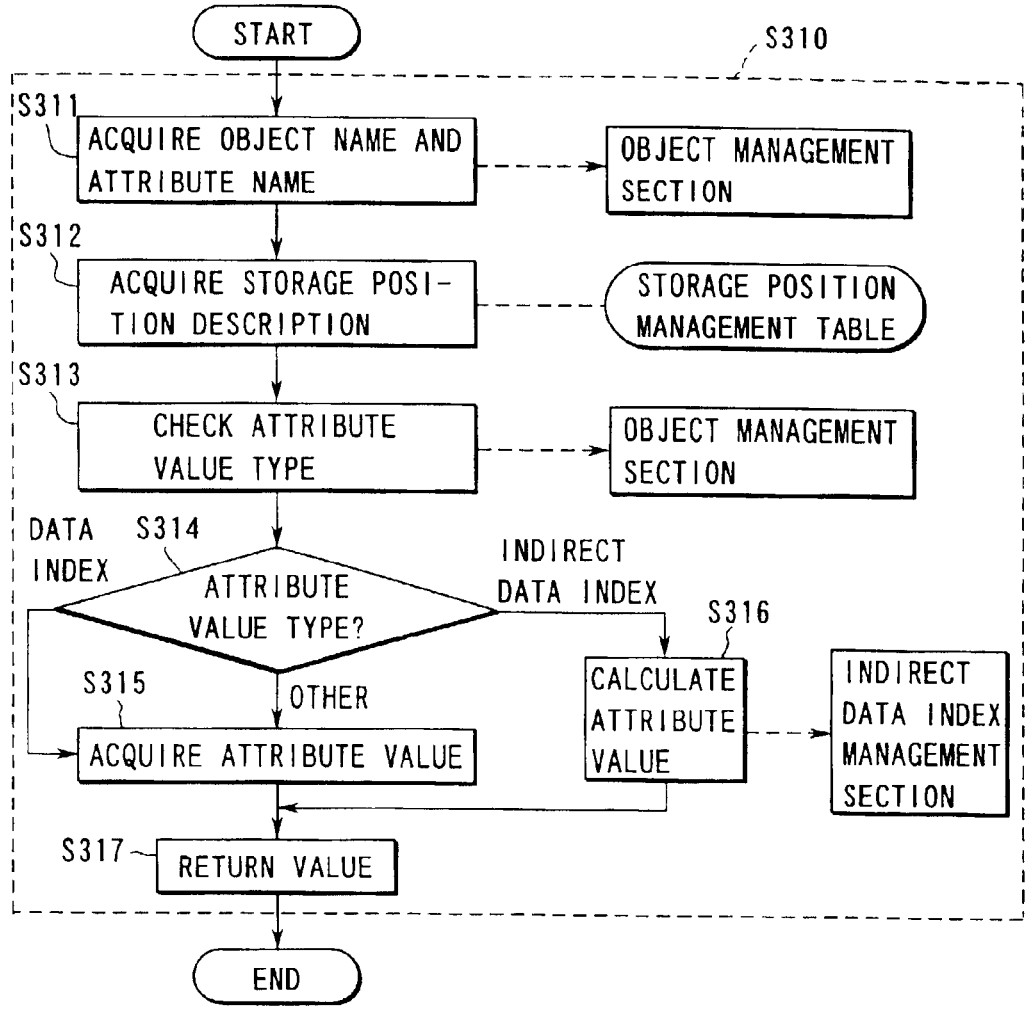
FIG. 38 is a flow chart showing a data read processing procedure using the metaindex description in the index management means.

FIG. 38 is a flow chart showing attribute value acquisition (step S310) by the index management section 410 in more detail.

When control is transferred to the index management section 410, the index management section 410 acquires the storage position description from the searched object name and attribute name, as in the write operation (S311 and S312) and determines the attribute value type (S314). When the attribute value type is "indirect data index," the indirect data index management section 420 calculates the attribute value with reference to a corresponding computational expression in the attribute definition table T10 and returns the value (S316 and S317).

If the attribute value type is not "indirect data index" but "data index" or "any other index," the attribute value is read using the storage position description. As far as synchronization between the attribute value recording table T20 and the real data on the database is maintained, the attribute value can be read from either the attribute value recording table T20 or the database. From the viewpoint of performance, it is preferably to read the attribute value from the attribute value recording table T20.

Assume That a Function
getValue ({section 1}. comment)
is given together with a specific value. In this case, a value "this section requires considerable correction" is obtained in accordance with the above-described processing flow (S300 to S317).

To perform search using a metaindex, a function of calculating matching between indices is required. For example, pattern matching or the like can be used.

Details of access when the attribute value is "data index" will be described.

First, a data read operation will be described. Assume that a function
getValue ({section 1}. abstract)
is input to the metaindex management section 440 through the input/output device 800.

Since "{section 1}. abstract" is not registered in the metaindex table T40, the given index description is transferred to the index management section 410 to refer to the attribute value. The attribute value type of the attribute corresponding to "{section 1}. abstract" is "data index," control is transferred to the data access device 300 to execute access in accordance with the following access procedure. FIG. 40 shows the procedure of access processing.

The data access device 300 obtains data of the access function of attribute "abstract" of {section 1} with reference to attribute definition data (S500).

Since the obtained "getValue" is a read function for an object, read access data is obtained from attribute data with attribute "abstract" (S510):
{doc, read, abstract, sectional, doc}
An access function associated with the read for doc is obtained with reference to an access function table shown in FIG. 41. Consequently, a function pointer *abstract is obtained, and the following function is synthesized (S520):
functionCall (*abstract, section 1, doc)
The data access device 300 executes this function processing for the database to access data "section 1. doc," thereby obtaining, as a data component, the summary of contents of "section 1, doc" (S530).

Since "first" is obtained as a function value of functionCall consequently, this value is displayed for the user as the value of "getValue" through the input/output device 800 (S540).

A data write operation will be described next.

A data write operation is executed with reference to, of attribute definition data, attribute definition associated with the write operation. When a write request putValue ({section 2}. contents, "item arrangement in patent specification, and . . . ")

is input from the input/output device 800, a function functionCall (*PutContens, section 2.doc, "item arrangement in patent specification, and")

is synthesized and executed in accordance with the same flow as described above for the data write operation (S500 to S530), so contents of the attribute value recording table T20 and "section 2, doc" in the database are updated.

(4) Reflection on Related Objects when Real Data is Changed

Figure 42:
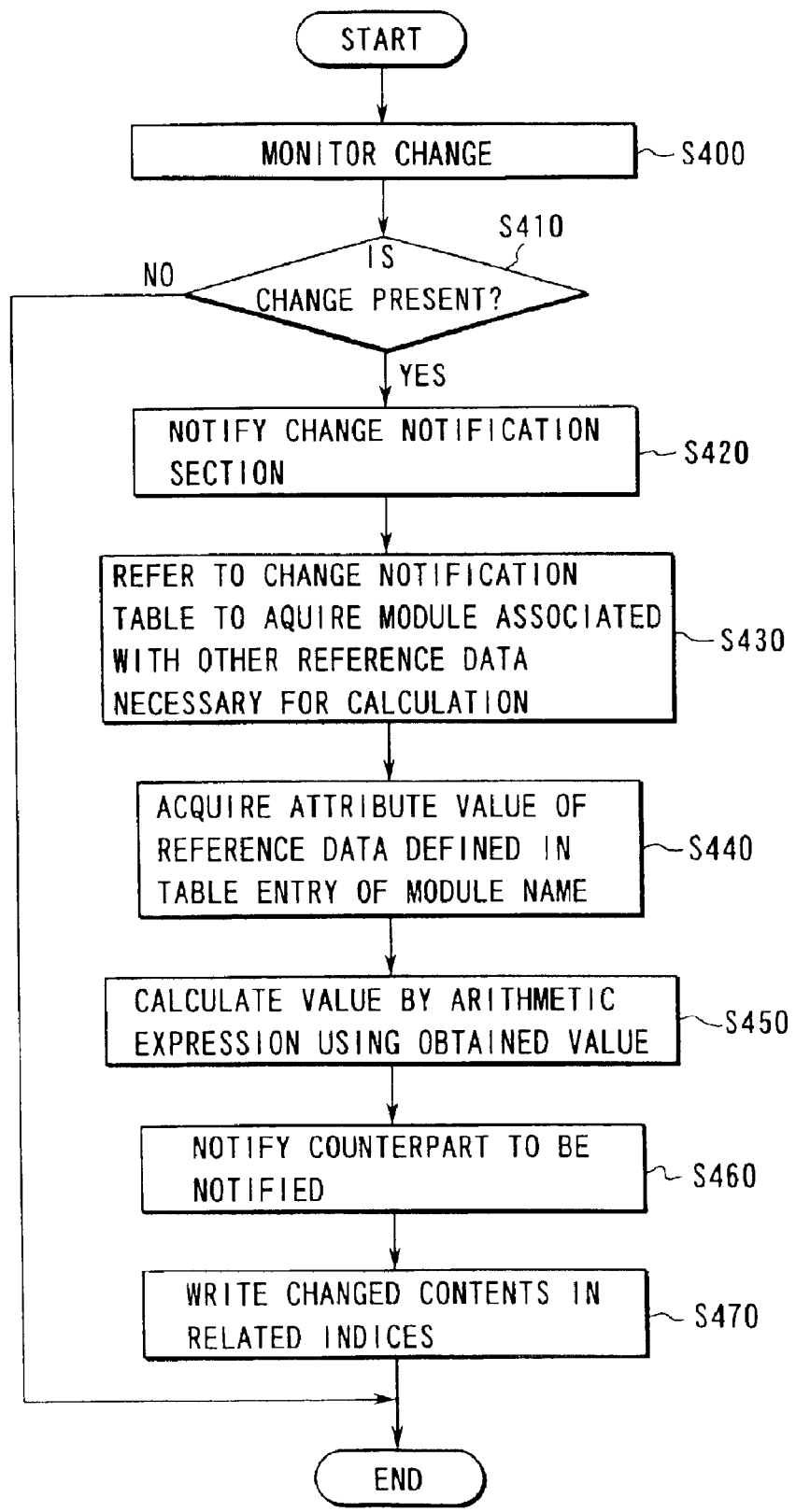
FIG. 42 is a flow chart showing a processing procedure of a change management section.

Contents of processing of automatically updating related objects by the change management device 500 when real data is changed will be described next. When the attribute value of an object changes due to the write operation, the change management device 500 provides a function of reflecting the change on another related attribute. A case wherein real data is changed will be described below. However, since attribute value data on the attribute value recording table T20 is also changed in synchronism with a change in real data, such real data is also included for an actual change. FIG. 42 is a flow chart showing the flow of processing of the change management device 500.

A case wherein the number of lines of {section 1} increases from 10 to 20 will be described in detail with reference to FIG. 42. First, the change detection section 510 (pub_no1) monitors a change in contents of objects registered in the change detection table T110 (S400). When the data changes (S410), the changes is detected, and the changed contents (20) are transmitted to the change notification section 520 (med_no1) (S420).

The change notification section 520 obtains, as other reference data necessary for reflecting the change, the numbers of lines of section 2 (pub_no2) and synopsis (pub_mat) as other reference data with reference to the change notification table T120 on the basis of the change notification source module name (S430 and S440) and obtains a new value "70" by summation based on the arithmetic expression (S450). When the change reflection section 530 (sub_no1) is notified of this value (S460), the change reflection section 530 updates the attribute value of attribute "total number of lines" of "report" on which the change is to be reflected, with reference to the change reflection table T130 (S470).

The change management device 500 generates related modules and incorporates the modules in the object in synchronism with generation of instances by the object management device 100.

In use of the change management device 500, when a plurality of objects refer to the same attribute value, only one module corresponding to the change detection section 510 and a plurality of communication destinations are registered in the change detection table T110. With this arrangement, when data changes, this change can be reflected on the plurality of corresponding objects simultaneously, so efficient change management is realized.

Generation and incorporation of modules by the change management device 500 are performed in generation of instances. Subsequent detection, notification, and reflection of the change are occasionally performed when the data changes.

Contents of processing of the interclass data management device 600 when a new class is defined will be described below. When a new class is necessary, the new class management section 620 additionally defines and registers new class data. In this case, class definition can be described using class data already present in the object management device 100. FIG. 43 shows an example of new class definition in this embodiment.

When the data storage and retrieval system of this embodiment is already operating, a new class definition system different from the existing class definition system is used. To access data stored in the data storage and retrieval system on the basis of the view for a new application, the following procedure is executed.

An interface such as the input/output device 800 is used to define a class group corresponding to the new view in the new class management section 620. In addition, a rule which describes the relation between the new class system and the existing class system is registered in the interclass data translation rule table T50 managed by the interclass data translation section 610.

The interclass data translation section 610 monitors instances generated by the object management device 100. When an instance corresponding to a rule is newly generated, the interclass data translation section 610 generates a corresponding instance in the new class system in accordance with the rule with reference to the interclass data translation rule table T50.

More specifically, when a new virtual class corresponding to the view for the application is defined from the existing class already having instances, external access is allowed as if an index corresponding to the new class were present.

Assume that new class C is defined by reusing the attributes of classes A and B, and a1 and a2 are present as instances of class A, and b1 and b2 are present as instances of class B. At this time, it can be regarded that class C has virtual instances c1 generated from (a1, b1)
c2 generated from (a1, b2)
c3 generated from (a2, b1)
c4 generated from (a2, b2)

Assume that an interclass data translation rule shown in FIG. 44 is defined for newly defined classes [text management operation] and [total management operation].

The interclass data translation section 610 monitors the object management device 100. When an instance of [text] class is generated, the interclass data translation section 610 refers to the interclass data translation rule. In accordance with the rule, an instance of [text management operation] corresponding to the instance is newly generated. The object reference of the original instance is written in the attribute value. In addition, an instance of [total management operation] is generated, and the instance of [text management operation] is written in the instance. As a result, new instances of [text management operation] which correspond to {section 1}, {section 2}, {synopsis}, and {report}, respectively, and one instance of [total management operation] are generated. FIG. 45 shows some of the virtual instances.

In this embodiment, when a new class is defined, the contents are translated at once. This translation is occasionally dynamically performed. For example, when an instance of a new section {section4} is generated, instances of text management operation associated with {section4} are newly dynamically generated with reference to progress data.

In use of the above-described metaindex management section 440, when the new class management section 620 defines a new class, and data corresponding to the new attribute is to be extracted from an existing object, an appropriate attribute of the existing object can be searched for, if any, and incorporated as indirect data index attribute definition of class definition.

(5) Data Access from New Application when External Application is Added or Changed As an example of flexible access from an external application to data stored in the data storage and retrieval system of this embodiment, contents of processing of the plug-in device 700 will be described below.

Even when the factors of a view assumed by an external application, i.e., terms such as a class name or attribute name, class system, and data structure do not match the terms, class system, and data structure of an existing object, the plug-in device 700 provides a function of maintaining matching in synchronism with a metaindex or the interclass data management device 600 and allowing the external application to virtually access the existing data.

If terms are different, the relation in the difference between terms, i.e., the correspondence between terms on the application side and terms on the object side is registered in the metaindex table T40. By this metaindex definition, the external application can access the data without being conscious of the difference from the terms of the existing data.

If the class system or data structure (attribute structure on the object side) is different, a new class system is defined in the new class management section 620, and a translation rule is defined in the interclass data translation rule table T50. The interclass data translation section 610 sequentially maintains matching in attribute data between the new class and the existing class on the basis of the definition. For this reason, the external application can easily access the existing data without knowing the internal structure of the existing database.

At this time, a write can also be performed by the overwrite section 430. Therefore, a write on real data on the database can be actually performed instead of updating the data to a pseudodata structure by simple indirect reference.

(6) Display of Contents of Managed Objects

Finally, processing of displaying contents of objects will be described below.

In the layout definition table T140 managed by the display section 820 in the input/output device 800, the contents of objects are described by indices instead of specific values. When display is to be performed, the value of an index is transferred to the metaindex management section 440 to acquire a corresponding attribute value, and index display is replaced with the attribute value to synthesis final display contents.

Layout definition is made using, e.g., HTML (Hyper Text Markup Language), and a format incorporating object data is defined by a character string using an index.

To display object data, the index character string in layout definition is expanded to an actual value using the function of the input/output section 810, i.e., getValue (index character string)

When the attribute value type of the return value is "single value," the index character string is directly replaced with the value. When the value has an attribute value type "list" or "table," a list or table corresponding to the layout language is generated, and replacement display corresponding to the table or list is performed.

In this embodiment, an indirect data index is defined using another specific attribute in the same object or an attribute of another specific object. This is equivalent to pasting of a data component between objects or automatic data component sharing by calculation.

In issuing and quoting in a composite text technology such as OpenDoc or OLE, partial data of a specific object or attribute is directly quoted to construct a composite text. That is, both the issuing and quoting sources are fixed.

However, this embodiment has various functions for allowing to secondarily add correspondence between various indices. For this reason, when an indirect data index is occasionally defined using a metaindex, the quoting source can be dynamically and flexibly changed in accordance with the contents of the metaindex without correcting the defined contents of other objects.

More specifically, by using these functions, a mechanism capable of dynamically setting and changing the issuing or quoting source later in issuing or quoting without specifying it in advance, and allowing flexible operation can be obtained. For discrimination from conventional issuing/quoting, this mechanism will be called transmission/reception.

As described above, according to this embodiment, the following data storage and retrieval system and data retrieval method using the system are provided.

(1) A data storage and retrieval system for registering an object corresponding to stored data and managing data of each data component obtained by dividing internal data of the stored data into arbitrary storage units using attributes of the object, comprising:

an object management section for managing class data containing data of one or a plurality of attributes of the object and instance data belonging to the class;

an index management section for managing data of an index describing a path for access to the data component; and a data access section for accessing the data component in the stored data on the basis of data storage position data about the data component, wherein the index management section has a metaindex management section for holding a correspondence between a metaindex secondarily added to the index and the index as a base of the metaindex, and the data component is accessed on the basis of the given metaindex by using the attribute of the object represented by the correspondence.

(2) A data storage and retrieval system according to arrangement (1), wherein the object management section has a relation management section for managing relation data holding between a plurality of objects, the index management section has an indirect data index management section for managing data of an indirect data index using the data component which is indirectly pointed from another attribute in one object or an attribute of another object through the relation, and the data component is accessed using the object attribute represented by the given indirect data index, and a new data component is generated from the obtained data component in accordance with a description of the indirect data index.

(3) A data storage and retrieval system according to arrangement (1) or (2), further comprising an interclass data management section having a new class management section for defining and managing new class data, and an interclass data translation section for holding an object translation rule describing a relation between a new class and an existing class and generating an instance corresponding to the new class in response to instance generation in the existing class on the basis of the translation rule.

(4) A data storage and retrieval system according to arrangement (3), further comprising a plug-in section for dynamically performing translation between an object attribute represented by the index given from an external application and an object attribute registered for an existing object using the translation rule and the metaindex which is defined on the basis of a correspondence between a view for the external application and an existing object system, and/or a new class definition of the interclass data management section.

(5) A data storage and retrieval system for registering an object corresponding to stored data and managing data of each data component obtained by dividing internal data of the stored data into arbitrary storage units using attributes of the object, comprising:

an object management device having a class management section for registering and managing class data of the object using an attribute definition table in which one or a plurality of attribute data of the object are recorded, an instance management section for registering and managing instance data belonging to the class using an attribute value recording table in which an attribute value corresponding to the attribute data is recorded together with storage position designation of a corresponding data component, and a relation management section for registering and managing relation information using a relation definition table in which data of a relation holding between a plurality of objects is recorded;

an index management device having a data registration section for registering a data component corresponding to an object attribute, a metaindex management section for expanding a given index description to an index of primary level as needed using at least a metaindex table in which a correspondence between an index describing a path for access to the data component and a metaindex secondarily added to the index is recorded, an index management section for accessing an attribute value in the attribute value recording table, which corresponds to the data component, from the index description given by the metaindex management means on the basis of the storage position designation of the data component using at least a storage position management table in which a correspondence between the attribute and the storage position designation of the data component is recorded, an indirect data index section for accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on the attribute definition table, and an overwrite section for calculating an attribute value to be written when the given object attribute is writable;

a change management device having a data access section for accessing the data component in the stored data on the basis of the storage position designation about the data component, a change detection section for monitoring a change in the data component and detecting the change, a change notification section for notifying a change reflection destination object of contents of the change, and a change reflection section for changing an attribute value of the change reflection destination object in accordance with contents of notification;

an interclass data management device having a new class management section for defining and managing new class data, and an interclass data translation section for generating a new instance corresponding to the new class on the basis of an object translation rule in response to generation of an instance in an existing class using an interclass translation rule table in which the translation rule is recorded, the translation rule describing a relation between the new class and the existing class;

a plug-in device for dynamically performing translation between an object attribute represented by the index given from an external application and an object attribute registered for an existing object using the metaindex and/or the interclass translation rule; and an input/output device having an input/output section for externally accessing the contents of the object, and a display section for displaying the contents of the object.

(6) A data retrieval method using a data storage and retrieval system for registering an object corresponding to stored data and managing data of each data component obtained by dividing internal data of the stored data into arbitrary storage sections using attributes of the object, comprising:

an index retrieval step of retrieving a data component in accordance with a given index describing a path for access to the data component using object attribute data and data storage position data;

an object retrieval step of outputting corresponding attribute data on the basis of the given description, using class data containing one or a plurality of attribute data of the object and instance data belonging to the class; and an data access step of accessing the data component in the stored data on the basis of the data storage position data about the data component, wherein the index retrieval step comprises a metaindex retrieval step of expanding the given index description to an index of primary level using a correspondence between a metaindex secondarily added to the index and the index as a base of the metaindex, and the data component is accessed on the basis of the given metaindex by using the attribute of the object represented by the correspondence.

(7) A data retrieval method according to arrangement (6), wherein the index retrieval step comprises a data index retrieval step of accessing the data component using an object attribute represented by an indirect index data using a data component which is indirectly pointed from another attribute in one object or an attribute of another object through the relation holding between a plurality of objects, and generating a new data component from the obtained data component in accordance with a description of the indirect data index.

(8) A data retrieval method according to arrangement (6) or (7), further comprising an interclass data translation step of, when a new class is defined, generating an instance corresponding to the new class in response to instance generation in an existing class on the basis of an object translation rule describing a relation between the new class and the existing class in advance.

(9) A data retrieval method according to arrangement (8), further comprising a plug-in step of, when retrieval data is input from an external application, dynamically performing translation between an object attribute represented by the index given from the external application and an object attribute registered for an existing object using the translation rule and metaindex data which is defined on the basis of a correspondence between a view for the external application and an existing object system, and/or a new class definition.

(10) A data retrieval method using a data storage and retrieval system for registering an object corresponding to stored data and managing data of each data component obtained by dividing internal data of the stored data into arbitrary storage sections using attributes of the object, comprising:

an index retrieval step of retrieving a data component in accordance with a given index describing a path for access to the data component using a storage position management table in which a correspondence between object attribute data and storage position designation of the data component is recorded;

a metaindex retrieval step of expanding a given index description to an index of primary level as needed using a metaindex table in which a correspondence between a metaindex secondarily added to the index and the index as a base of the metaindex is recorded;

an indirect data index retrieval step of accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on an attribute definition table in which one or a plurality of attribute data of the object are recorded;

an overwrite step of calculating an attribute value to be written when the given object attribute is writable;

an object retrieval step of outputting corresponding attribute data on the basis of the given description, using at least the attribute definition table, from class data of the object and instance data belonging to the class;

a data access step of accessing the data component in the stored data on the basis of the data storage position data about the data component;

a change detection step of monitoring a change in the data component and detecting the change;

a change notification step of notifying a change reflection destination object of contents of the change upon receiving notification of detection of the change;

a change reflection step of changing an attribute value of the change reflection destination object in accordance with contents of notification;

an interclass data translation step of generating a new instance corresponding to a new class on the basis of a translation rule in response to generation of an instance in an existing class using an interclass data translation rule table in which the object translation rule describing a relation between the new class and the existing class is recorded;

a plug-in step of dynamically performing translation between an object attribute represented by the index given from an external application and an object attribute registered for an existing object on the basis of metaindex data and/or interclass translation rule data;

an input/output step of externally accessing the contents of the object; and a display step of displaying the contents of the object.

According to the present invention, the following effects can be obtained.

(1) In referring to data, an indirect index from another attribute in the same object or another object through a relation can be used, and data can be directly updated from such an index. That is, since the relation between objects can be handled as an index attribute, the attribute data of another object can be used as if it were the self attribute data.

(2) Since an index can be secondarily added to another index, an ambiguous, i.e., flexible index (metaindex) which is abstract and more close to the view for an application and is not influenced by a change in instance can be used. In addition, even unstructurized data can be accessed by adding an index to the data.

(3) When real data is changed, related objects can be efficiently notified of the changed data to reflect the change, so the consistency between data and related objects can be maintained.

(4) Even when a new class is defined, an instance can be generated in the new class system with reference to the contents of the existing object system, so existing object data can be translated and used.

(5) Even when the view assumed by an external application is different from existing object data, the data can be accessed from the application without being conscious of the difference because of the function of the plug-in section.

As has been described above, according to the present invention, there is provided a data storage and retrieval system which allows a user to freely change the data presentation form from his/her viewpoint to widen the data utilization range and promote data utilization.

Since the function of an abstract, secondary, and flexible index of class level which is more close to the view for an application is provided, data and a data component can be flexibly and efficiently accessed from an external device in accordance with each application without being influenced by a change in object or view for the application. Even when the contents of an object are changed, maintenance is easy, so efficient access can be performed on the basis of the view for an external application, as needed.

Not only structurized data such as graphic data, document data, or database data but also unstructurized data such as texts can be easily accessed from various applications independently of the nature, i.e., the structure of the data to be accessed. With this arrangement, the independence of data from external access can be increased, so the sharing and reuse properties of data components can be improved.

The present invention does not depend on the data type (or is transparent from the type), and the application field is not particularly limited. Especially, in a field where data are frequently changed, and a strong demand for data sharing is present, i.e., editing data including documents or design operation, the present invention largely increases the productivity.

Even when the view from an external application is changed or newly set to result in mismatch to the existing object system, the difference is eliminated by the plug-in section, so a new application can be easily installed.

Since the function of an indirect index from another attribute in the same object or another object through a relation is provided, related data components can be accessed or calculated at once. For this reason, even attribute data of another object can also be used as self attribute data, so the efficiency of data processing can be increased to allow flexible data access. Hence, data access from various applications can be more easily performed, and data sharing and reuse properties can be improved.

The system also has the function of managing the correlation between the existing class and a newly generated class. Therefore, even when a new class is generated, the contents of the existing object system can be translated and used without redefining objects corresponding to the new class, so maintenance of objects related to data components becomes easy.

The system also has the function of translating the view from an external application into an appropriate index for an existing object. This allows to easily cope with a change in the external view and also installation of a new application or a change in application. Hence, the data reuse and sharing properties can be further improved.

Since the system also has the function of occasionally reflecting changed contents of data to a corresponding object and other related objects, the consistency between the data and related objects can be maintained. With this arrangement, the stored data can be more easily managed and maintained.

As described above, a data environment can be provided in which, when the present invention is applied, data components can be easily accessed and processed from various external applications or users, and even when stored data, an object, or an external application is changed or added, the data reuse properties are not damaged. Therefore, the flexibility of the system can be ensured, and the data and software assets can be sufficiently utilized for general purposes.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data storage and retrieval system comprising:
   storage means for storing data belonging to a predetermined category and definition data which is made to correspond to the data and describes definition of a data structure and a data presentation form;
   retrieval means for retrieving the data and the definition data made to correspond to the data from said storage means on the basis of input retrieval data;
   rewrite means for rewriting, based on another definition data stored in said storage means, the definition data made to correspond to data retrieved by said retrieval means; and
   presentation means for presenting, based on the definition data rewritten by said rewrite means, the data retrieved by said retrieval means,
   wherein said storage means comprise:
   means for registering an object corresponding to data and managing data of each data component obtained by dividing the data into arbitrary storage sections using attributes of the object;
   an object management section for managing class data containing data of one or a plurality of attributes of the object and instance data belonging to the class;
   an index management section for managing data of an index describing a path for access to the data component; and
   a data access section for accessing the data component in the stored data on the basis of data storage position data about the data component;
   wherein said index management section comprises metaindex management means for holding a correspondence between a metaindex secondarily added to the index and the index as a base of the metaindex, and
   wherein the data component is accessed on the basis of the given metaindex by using the attribute of the object represented by the correspondence, and wherein said system further comprises an interclass data management section comprising:
   new class management means for defining and managing new class data; and
   interclass data translation means for holding an object translation rule describing a relation between a new class and an existing class and generating an instance corresponding to the new class in response to instance generation in the existing class on the basis of the translation rule.

2. The system according to claim 1, wherein the definition data contains an identifier for identifying the data structure and the presentation form described by the definition data, and said rewrite means collates the identifier contained in the definition data made to correspond to the data retrieved by said retrieval means with an identifier contained in the another definition data to determines whether the data can be rewritten.

3. The system according to claim 1, wherein said retrieval means retrieves the data and the definition data through a network on the input retrieval data.

4. The system according to claim 1, wherein said object management section comprises relation management means for managing relation data holding between a plurality of objects,
   said index management section comprises indirect data index management means for managing data of an indirect data index using the data component which is indirectly pointed from another attribute in one object or an attribute of another object through the relation, and
   the data component is accessed using the object attribute represented by the given indirect data index, and a new data component is generated from the obtained data component in accordance with a description of the indirect data index.

5. The system according to claim 1, further comprising a plug-in section for dynamically performing translation between an object attribute represented by the index given from an external application and an object attribute registered for an existing object using the translation rule and the metaindex which is defined on the basis of a correspondence between a view for the external application and an existing object system, and/or a new class definition of said interclass data management section.

6. The system according to claim 1, wherein said storage means comprises:
   means for registering an object corresponding to data and managing data of each data component obtained by dividing the data into arbitrary storage sections using attributes of the object;
   an object management device having class management means for registering and managing class data of the object using at least an attribute definition table in which one or a plurality of attribute data of the object are recorded, instance management means for registering and managing instance data belonging to the class using at least an attribute value recording table in which an attribute value corresponding to the attribute data is recorded together with storage position designation of a corresponding data component, and relation management means for registering and managing relation information using a relation definition table in which data of a relation holding between a plurality of objects is recorded;
   an index management device having data registration means for registering a data component corresponding to an object attribute, metaindex management means for expanding a given index description to an index of primary level as needed using at least a metaindex table in which a correspondence between an index describing a path for access to the data component and a metaindex secondarily added to the index is recorded, index management means for accessing an attribute value in the attribute value recording table, which corresponds to the data component, from the index description given by said metaindex management section on the basis of the storage position designation of the data component using a storage position management table in which a correspondence between the attribute and the storage position designation of the data component is recorded, indirect data index management means for accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on the attribute definition table, and overwrite means for calculating an attribute value to be written when the given object attribute is writable;

a data access device for accessing the data component in the stored data on the basis of the storage position designation about the data component, a change management device having change detection means for monitoring a change in the data component and detecting the change, change notification means for notifying a change reflection destination object of contents of the change, and change reflection means for changing an attribute value of the change reflection destination object in accordance with contents of notification;

an interclass data management device having new class management means for defining and managing new class data, and interclass data translation means for generating a new instance corresponding to the new class on the basis of an object translation rule in response to generation of an instance in an existing class using at least an interclass data translation rule table in which the translation rule is recorded, the translation rule describing a relation between the new class and the existing class;

a plug-in device for dynamically performing translation between an object attribute represented by the index given from an external application and an object attribute registered for an existing object using the metaindex and/or the interclass translation rule; and an input/output device having input/output means for externally accessing the contents of the object, and display means for displaying the contents of the object.

7. A data storage and retrieval system comprising:

storage means for storing data belonging to a predetermined category and definition data describing definitions of a structure and the presentation form of the data;

retrieval means for retrieving presentable data from said storage means on the basis of designated definition data; and presentation means for presenting, based on the designated definition data, the data retrieved by said retrieval means, wherein said storage means comprises:

means for registering an object corresponding to data and managing data of each data component obtained by dividing the data into arbitrary storage sections using attributes of the object;

an object management device for managing class data containing data of one or a plurality of attributes of the object and instance data belonging to the class;

an index management device for managing data of an index describing a path for access to the data component; and a data access device for accessing the data component in the stored data on the basis of data storage position data about the data component, wherein said index management device comprises metaindex management means for holding a correspondence between a metaindex secondarily added to the index and the index as a base of the metaindex, and wherein the data component is accessed on the basis of the given metaindex by using the attribute of the object represented by the correspondence, and wherein said system further comprises an interclass data management device comprising:

new class management means for defining and managing new class data; and interclass data translation means for holding an object translation rule describing a relation between a new class and an existing class and generating an instance corresponding to the new class in response to instance generation in the existing class on the basis of the translation rule.

8. The system according to claim 7, wherein said retrieval means retrieves the data having a presentable data structure through a network on the basis of the designated definition data.

9. The system according to claim 7, wherein said object management device comprises relation management means for managing relation data holding between a plurality of objects, said index management device comprises indirect data index management means for managing data of an indirect data index using the data component which is indirectly pointed from another attribute in one object or attribute of another object through the relation, and the data component is accessed using the object attribute represented by the given indirect data index, and a new data component is generated from the obtained data component in accordance with a description of the indirect data index.

10. The system according to claim 7, further comprising a plug-in device for dynamically performing translation between an object attribute represented by the index given from an external application and an object attribute registered for an existing object using the translation rule and the metaindex which is defined on the basis of a correspondence between a view for the external application and an existing object system, and/or a new class definition of said interclass data management device.

11. The system according to claim 7, wherein said storage means comprises:

means for registering an object corresponding to data and managing data of each data component obtained by dividing the data into arbitrary storage sections using attributes of the object;

an object management device having a class management means for registering and managing class data of the object using at least an attribute definition table in which one or a plurality of attribute data of the object are recorded, instance management means for registering and managing instance data belonging to the class using at least an attribute value recording table in which an attribute value corresponding to the attribute data is recorded together with storage position designation of a corresponding data component, and relation management means for registering and managing relation information using a relation definition table in which data of a relation holding between a plurality of objects is recorded;

an index management device having data registration means for registering a data component corresponding to an object attribute, metaindex management means for expanding a given index description to an index of primary level as needed using at least a metaindex table in which a correspondence between an index describing a path for access to the data component and a metaindex secondarily added to the index is recorded, index management means for accessing an attribute value in the attribute value recording table, which corresponds to the data component, from the index description given by said metaindex management means on the basis of the storage position designation of the data component using a storage position management table in which a correspondence between the attribute and the storage position designation of the data component is recorded, indirect data index management means for accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on the attribute definition table, and overwrite means for calculating an attribute value to be written when the given object attribute is writable;

a data access device for accessing the data component in the stored data on the basis of the storage position designation about the data component;

a change management device having change detection means for monitoring a change in the data component and detecting the change, change notification means for notifying a change reflection destination object of contents of the change, and change reflection means for changing an attribute value of the change reflection destination object in accordance with contents of notification;

an interclass data management device having new class management means for defining and managing new class data, and interclass data translation means for generating a new instance corresponding to the new class on the basis of an object translation rule in response to generation of an instance in an existing class using at least an interclass data translation rule table in which the translation rule is recorded, the translation rule describing a relation between the new class and the existing class;

a plug-in device for dynamically performing translation between an object attribute represented by the index given from an external application and an object attribute registered for an existing object using the metaindex and/or the interclass translation rule; and an input/output device having input/output means for externally accessing the contents of the object, and display means for displaying the contents of the object.

12. A data storage and retrieval system comprising:

storage means for storing data belonging to a predetermined category and definition data which is made to correspond to the data and describes definition of a data structure and a data presentation form;

retrieval means for retrieving the data and the definition data made to correspond to the data from said storage means on the basis of input retrieval data;

rewrite means for rewriting , based on another definition data stored in said storage means, the definition data made to correspond to data retrieved by said retrieval means; and presentation means for presenting, based on the definition data rewritten by said rewrite means, the data retrieved by said retrieval means, wherein said storage means comprises:

means for registering an object corresponding to data and managing data of each data component obtained by dividing the data into arbitrary storage sections using attributes of the object;

an object management device having class management means for registering and managing class data of the object using at least an attribute definition table in which one or a plurality of attribute data of the object are recorded, instance management means for registering and managing instance data belonging to the class using at least an attribute value recording table in which an attribute value corresponding to the attribute data is recorded together with storage position designation of a corresponding data component, and relation management means for registering and managing relation information using a relation definition table in which data of a relation holding between a plurality of objects is recorded;

an index management device having data registration means for registering a data component corresponding to an object attribute, metaindex management means for expanding a given index description to an index of primary level as needed using at least a metaindex table in which a correspondence between an index describing a path for access to the data component and a metaindex secondarily added to the index is recorded, index management means for accessing an attribute value in the attribute value recording table, which corresponds to the data component, from the index description given by said metaindex management section on the basis of the storage position designation of the data component using a storage position management table in which a correspondence between the attribute and the storage position designation of the data component is recorded, indirect data index management means for accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on the attribute definition table, and overwrite means for calculating an attribute value to be written when the given object attribute is writable;

a data access device for accessing the data component in the stored data on the basis of the storage position designation about the data component;

a change management device having change detection means for monitoring a change in the data component and detecting the change, change notification means for notifying a change reflection destination object of contents of the change, and change reflection means for changing an attribute value of the change reflection destination object in accordance with contents of notification;

an interclass data management device having new class management means for defining and managing new class data, and interclass data translation means for generating a new instance corresponding to the new class on the basis of an object translation rule in response to generation of an instance in an existing class using at least an interclass data translation rule table in which the translation rule is recorded, the translation rule describing a relation between the new class and the existing class;

a plug-in device for dynamically performing translation between an object attribute represented by the index given from an external application and an object attribute registered for an existing object using the metaindex and/or the interclass translation rule; and an input/output device having input/output means for externally accessing the contents of the object, and display means for displaying the contents of the object.

13. The system according to claim 12, wherein the definition data contains an identifier for identifying the data structure and the presentation form described by the definition data, and said rewrite means collates the identifier contained in the definition data made to correspond to the data retrieved by said retrieval means with an identifier contained in the another definition data to determine whether the data can be rewritten.

14. The system according to claim 12, wherein said retrieval means retrieves the data and the definition data through a network on the basis of the input retrieval data.

15. The system according to claim 12, wherein said storage means comprise:

means for registering an object corresponding to data and managing data of each data component obtained by dividing the data into arbitrary storage sections using attributes of the object;

an object management section for managing class data containing data of one or a plurality of attributes of the object and instance data belonging to the class;

an index management section for managing data of an index describing a path for access to the data component; and a data access section for accessing the data component in the stored data on the basis of data storage position data about the data component;

said index management section comprises metaindex management means for holding a correspondence between a metaindex secondarily added to the index and the index as a base of the metaindex; and the data component is accessed on the basis of the given metaindex by using the attribute of the object represented by the correspondence.

16. The system according to claim 15, wherein said object management section comprises relation management means for managing relation data holding between a plurality of objects, said index management section comprises indirect data index management means for managing data of an indirect data index using the data component which is indirectly pointed from another attribute in one object or an attribute of another object through the relation, and the data component is accessed using the object attribute represented by the given indirect data index, and a new data component is generated from the obtained data component in accordance with a description of the indirect data index.

17. The system according to claim 15, further comprising an interclass data management section comprising:

new class management means for defining and managing new class data; and interclass data translation means for holding an object translation rule describing a relation between a new class and an existing class and generating an instance corresponding to the new class in response to instance generation in the existing class on the basis of the translation rule.

18. The system according to claim 17, further comprising a plug-in section for dynamically performing translation between an object attribute represented by the index given from an external application and an object attribute registered for an existing object using the translation rule and the metaindex which is defined on the basis of a correspondence between a view for the external application and an existing object system, and/or a new class definition of said interclass data management section.

19. A data storage and retrieval system comprising:

storage means for storing data belonging to a predetermined category and definition data describing definitions of a structure and the presentation form of the data;

retrieval means for retrieving presentable data from said storage means on the basis of designated definition data; and presentation means for presenting, based on the designated definition data, the data retrieved by said retrieval means, and wherein said storage means comprises:

means for registering an object corresponding to data and managing data of each data component obtained by dividing the data into arbitrary storage sections using attributes of the object;

an object management device having class management means for registering and managing class data of the object using at least an attribute definition table in which one or a plurality of attribute data of the object are recorded, instance management means for registering and managing instance data belonging to the class using at least an attribute value recording table in which an attribute value corresponding to the attribute data is recorded together with storage position designation of a corresponding data component, and relation management means for registering and managing relation information using a relation definition table in which data of a relation holding between a plurality of objects is recorded;

an index management device having data registration means for registering a data component corresponding to an object attribute, metaindex management means for expanding a given index description to an index of primary level as needed using at least a metaindex table in which a correspondence between an index describing a path for access to the data component and a metaindex secondarily added to the index is recorded, index management means for accessing an attribute value in the attribute value recording table, which corresponds to the data component, from the index description given by said metaindex management means on the basis of the storage position designation of the data component using a storage position management table in which a correspondence between the attribute and the storage position designation of the data component is recorded, indirect data index management means for accessing the data component using an object attribute represented by an indirect data index using the data component which is indirectly pointed from another attribute in one object or an attribute of another object through the relation, and calculating contents of a virtual data component from the obtained data component in accordance with a description of the indirect data index on the attribute definition table, and overwrite means for calculating an attribute value to be written when the given object attribute is writable;

a data access device for accessing the data component in the stored data on the basis of the storage position designation about the data component;

a change management device having change detection means for monitoring a change in the data component and detecting the change, change notification means for notifying a change reflection destination object of contents of the change, and change reflection means for changing an attribute value of the change reflection destination object in accordance with contents of notification;

an interclass data management device having new class management means for defining and managing new class data, and interclass data translation means for generating a new instance corresponding to the new class on the basis of an object translation rule in response to generation of an instance in an existing class using at least an interclass data translation rule table in which the translation rule is recorded, the translation rule describing a relation between the new class and the existing class;

a plug-in device for dynamically performing translation between an object attribute represented by the index given from an external application and an object attribute registered for an existing object using the metaindex and/or the interclass translation rule; and an input/output device having input/output means for externally accessing the contents of the object, and display means for displaying the contents of the object.

20. The system according to claim 19, wherein said retrieval means retrieve the data having a presentable data structure through a network on the basis of the designated definition data.

21. The system according to claim 19, wherein said storage means comprise:

means for registering an object corresponding to data and managing data of each data component obtained by dividing the data into arbitrary storage sections using attributes of the object;

an object management device for managing class data containing data of one or a plurality of attributes of the object and instance data belonging to the class;

an index management device for managing data of an index describing a path for access to the data component; and a data access device for accessing the data component in the stored data on the basis of data storage position data about the data component;

said index management device comprises metaindex management means for holding a correspondence between a metaindex secondarily added to the index and the index as a base of the metaindex; and the data component is accessed on the basis of the given metaindex by using the attribute of the object represented by the correspondence.

22. The system according to claim 21, wherein said object management device comprises relation management means for managing relation data holding between a plurality of objects, said index management device comprises indirect data index management means for managing data of an indirect data index using the data component which is indirectly pointed from another attribute in one object or attribute of another object through the relation, and the data component is accessed using the object attribute represented by the given indirect data index, and a new data component is generated from the obtained data component in accordance with a description of the indirect data index.

23. The system according to claim 21, further comprising an interclass data management device comprising:

new class management means for defining and managing new class data; and interclass data translation means for holding an object translation rule describing a relation between a new class and an existing class and generating an instance corresponding to the new class in response to instance generation in the existing class on the basis of the translation rule.

24. The system according to claim 23, further comprising a plug-in device for dynamically performing translation between an object attribute represented by the index given from an external application and an object attribute registered for an existing object using the translation rule and the metaindex which is defined on the basis of a correspondence between a view for the external application and an existing object system, and/or a new class definition of said interclass data management device.

* * * * *